United States Patent
Kim et al.

(10) Patent No.: US 11,749,271 B2
(45) Date of Patent: Sep. 5, 2023

(54) METHOD FOR CONTROLLING EXTERNAL DEVICE BASED ON VOICE AND ELECTRONIC DEVICE THEREOF

(71) Applicant: Samsung Electronics Co., Ltd., Gyeonggi-do (KR)

(72) Inventors: Taegu Kim, Gyeonggi-do (KR);
Hansin Koh, Gyeonggi-do (KR);
Yoonju Lee, Gyeonggi-do (KR);
Jooyeon Kim, Gyeonggi-do (KR);
Hyeonjae Bak, Gyeonggi-do (KR);
Gajin Song, Gyeonggi-do (KR)

(73) Assignee: Samsung Electronics Co., Ltd

( * ) Notice: Subject to any disclaimer, the term of this patent is extended or adjusted under 35 U.S.C. 154(b) by 196 days.

(21) Appl. No.: 17/205,625

(22) Filed: Mar. 18, 2021

(65) Prior Publication Data

US 2021/0295835 A1    Sep. 23, 2021

(30) Foreign Application Priority Data

Mar. 18, 2020    (KR) ........................ 10-2020-0033037

(51) Int. Cl.
     *G10L 15/22*         (2006.01)

(52) U.S. Cl.
     CPC ........ *G10L 15/22* (2013.01); *G10L 2015/223* (2013.01)

(58) Field of Classification Search
     CPC .......................... G10L 15/22; G10L 2015/223
     See application file for complete search history.

(56) References Cited

U.S. PATENT DOCUMENTS

| | | |
|---|---|---|
| 6,792,323 B2 | 9/2004 | Krzyzanowski et al. |
| 7,024,256 B2 | 4/2006 | Krzyzanowski et al. |
| 10,432,756 B2 | 10/2019 | Krzyzanowski et al. |
| 10,887,124 B2 | 1/2021 | Jung |
| 11,004,452 B2 | 5/2021 | Lee et al. |
| 2008/0221715 A1 | 9/2008 | Krzyzanowski et al. |
| 2017/0154638 A1* | 6/2017 | Hwang ................... G01S 3/803 |

(Continued)

FOREIGN PATENT DOCUMENTS

| | | |
|---|---|---|
| KR | 1020070110278 | 11/2007 |
| KR | 101903706 | 10/2018 |

(Continued)

OTHER PUBLICATIONS

International Search Report dated Jul. 13, 2021 issued in counterpart application No. PCT/KR2021/003327, 3 pages.

*Primary Examiner* — Ibrahim Siddo
(74) *Attorney, Agent, or Firm* — The Farrell Law Firm, P.C.

(57) ABSTRACT

A method for an electronic device to control at least one external electronic device is provided. The method includes receiving an input for calling a voice-based assistant of the electronic device from a user, broadcasting, in response to the input, a request signal for requesting transmission of a response signal, receiving the response signal including location information about at least one external electronic device from the at least one external electronic device, obtaining a location of the electronic device based on the response signal, receiving a control utterance from the user, and transmitting the control utterance and location information about the electronic device to a server device.

12 Claims, 14 Drawing Sheets

(56) References Cited

U.S. PATENT DOCUMENTS

| | | | |
|---|---|---|---|
| 2018/0146042 A1 | 5/2018 | Choi | |
| 2019/0081810 A1* | 3/2019 | Jung | H04L 12/2827 |
| 2019/0339840 A1* | 11/2019 | Park | G06F 3/04815 |
| 2019/0385594 A1 | 12/2019 | Park et al. | |
| 2019/0392834 A1 | 12/2019 | Yi et al. | |
| 2020/0043491 A1 | 2/2020 | Lee et al. | |
| 2020/0043497 A1 | 2/2020 | Hahm et al. | |
| 2021/0075634 A1 | 3/2021 | Jung | |

FOREIGN PATENT DOCUMENTS

| | | |
|---|---|---|
| KR | 1020190075870 | 7/2019 |
| KR | 1020200015083 | 2/2020 |

\* cited by examiner

METHOD FOR CONTROLLING EXTERNAL DEVICE BASED ON VOICE AND ELECTRONIC DEVICE THEREOF

CROSS-REFERENCE TO RELATED APPLICATION(S)

This application claims the benefit under 35 U.S.C. § 119(a) of a Korean patent application filed on Mar. 18, 2020 in the Korean Intellectual Property Office and assigned Serial number 10-2020-0033037, the entire disclosure of which is hereby incorporated by reference.

BACKGROUND

1. Field

The present disclosure relates generally to a method for controlling an external device based on a voice and an electronic device therefor.

2. Description of Related Art

Since the types and number of electronic devices that support an Internet connection increase, various electronic devices may be managed in a user-oriented manner. For example, a plurality of electronic devices may be associated with a single user account, and a user may integrally manage the plurality of electronic devices through the user account. An electronic device may receive a user input (e.g., a voice input) through a voice agent program, and may control other electronic devices based on the voice input.

The user may execute the voice agent program of the electronic device using a specified wakeup word. The electronic device may recognize the wakeup word in order to execute the voice agent program. In order to recognize the wakeup word, the electronic device may use a wakeup recognition model (hereinafter referred to as a wakeup model). The electronic device may recognize reception of the wakeup word by processing the wakeup word based on the wakeup model and a specified algorithm (e.g., a hidden Markov model (HMM) or artificial neural network).

Various electronic devices equipped with a voice agent are being released. For example, various home appliances such as a refrigerator, a TV, a speaker, an air cleaner, and an air conditioner may be equipped with a voice agent. When various electronic devices that support a voice agent are present within a limited space, it may be required to determine an electronic device that is a target for a voice command from a user. For example, two TVs may be installed in a user's home. It may not be clear which TV should process a user's voice command for TV.

Location information about a plurality of electronic devices may be used in order to specify an electronic device for processing a voice command among the electronic devices. For example, for each of the electronic devices, the user may specify the location of the electronic device. The user may specify, through a voice command including the location information, an electronic device for processing the voice command. However, when the user uses a voice command that does not include the location information, the voice command may not be processed. Furthermore, when an electronic device is moved, the user may have to update the location of the electronic device each time the electronic device is moved. In particular, in the case of a mobile electronic device, the user is substantially unable to set the location of the electronic device.

SUMMARY

The present disclosure has been made to address at least the disadvantages described above and to provide at least the advantages described below.

In accordance with an aspect of the present disclosure, an electronic device is provided. The electronic device includes an audio reception circuit, a communication circuit, a processor operatively connected to the audio reception circuit and the communication circuit, and a memory operatively connected to the processor. The memory stores one or more instructions that, when executed, cause the processor to receive an input for calling a voice-based assistant of the electronic device from a user, broadcast, in response to the input, a request signal for requesting transmission of a response signal using the communication circuit, receive the response signal including location information about at least one external electronic device from the at least one external electronic device using the communication circuit, obtain a location of the electronic device based on the response signal, receive a control utterance from the user using the audio reception circuit, and transmit the control utterance and location information about the electronic device to a server device using the communication circuit.

In accordance with an aspect of the present disclosure, method for an electronic device to control at least one external electronic device is provided. The method includes receiving an input for calling a voice-based assistant of the electronic device from a user, broadcasting, in response to the input, a request signal for requesting transmission of a response signal, receiving the response signal including location information about at least one external electronic device from the at least one external electronic device, obtaining a location of the electronic device based on the response signal, receiving a control utterance from the user, and transmitting the control utterance and location information about the electronic device to a server device.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
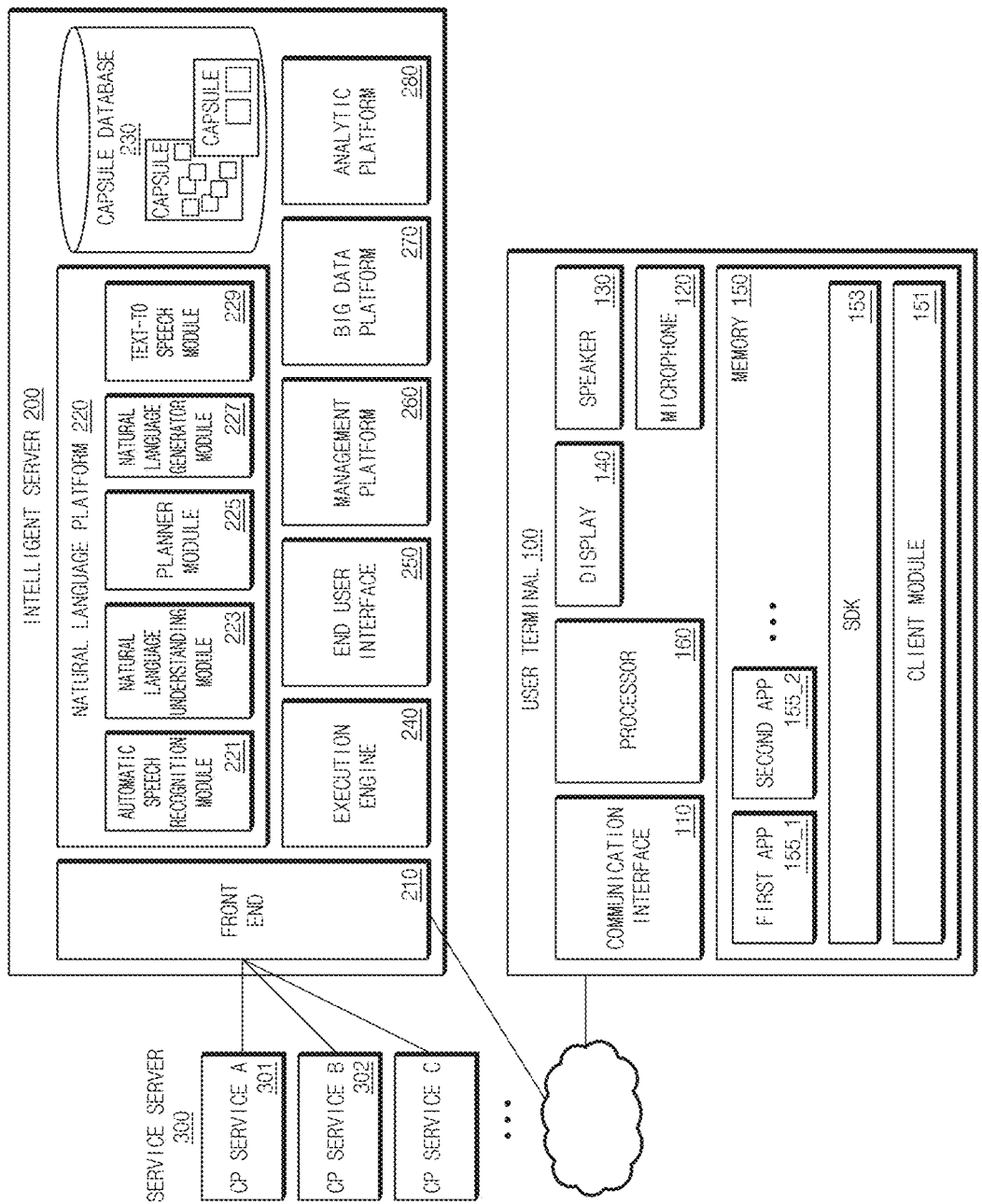
FIG. 1 is a block diagram illustrating an integrated intelligence system, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

FIG. 1 is a block diagram illustrating an integrated intelligence system, according to an embodiment.

Referring to FIG. 1, an integrated intelligence system may include a user terminal 100, an intelligence server 200, and a service server 300.

The user terminal 100 may be a terminal device (or an electronic device) connectable to the Internet, such as a mobile phone, a smartphone, a personal digital assistant (PDA), a laptop computer, a television (TV), white goods, a wearable device, a head mounted device (HMD), or a smart speaker.

The user terminal 100 may include a communication interface 110, a microphone 120, a speaker 130, a display 140, a memory 150, or a processor 160. The above elements may be operatively or electrically connected to each other.

The communication interface 110 may be connected to an external device to transmit/receive data. The microphone 120 may receive a sound (e.g., a user utterance) and may convert the sound into an electric signal. The speaker 130 may output an electric signal as a sound (e.g., a voice). The display 140 may be configured to display an image or video. The display 140 may also display a graphic user interface (GUI) of an executed application (or an application program).

The memory 150 may store a client module 151, a software development kit (SDK) 153, and a plurality of applications 155. The client module 151 and the SDK 153 may constitute a framework (or a solution program) for executing a general-purpose function. Furthermore, the client module 151 or the SDK 153 may constitute a framework for processing a voice input.

The plurality of applications 155 may be programs for executing a specified function. The plurality of applications 155 may include a first application 155_1 and/or second application 155_2. Each of the plurality of applications 155 may include a plurality of operations for executing a specified function. The applications may include an alarm application, a message application, and/or a schedule application. The plurality of applications 155 may be executed by the processor 160 to sequentially perform at least a portion of the plurality of operations.

The processor 160 may control overall operation of the user terminal 100. The processor 160 may be electrically connected to the communication interface 110, the microphone 120, the speaker 130, and the display 140 to perform a specified operation. The processor 160 may include at least one processor.

The processor 160 may execute the programs stored in the memory 150 to execute a specified function. The processor 160 may execute at least one of the client module 151 or the SDK 153 to perform the following operations for processing a voice input. The processor 160 may control operation of the plurality of applications 155 through, for example, the SDK 153. The following operations described as operations of the client module 151 or the SDK 153 may be operations performed by operation of the processor 160.

The client module 151 may receive a voice input. The client module 151 may receive a voice input corresponding to a user utterance detected through the microphone 120. The client module 151 may transmit the received voice input (e.g., a voice signal) to the intelligence server 200. The client module 151 may transmit, to the intelligence server 200, state information about the user terminal 100 together with the received voice input. The state information may be, for example, execution state information about an application.

The client module 151 may receive a result corresponding to the received voice input. The client module 151 may receive the result corresponding to the received voice input when the intelligence server 200 is capable of calculating the result corresponding to the received voice input. The client module 151 may display the received result on the display 140.

The client module 151 may receive a plan corresponding to the received voice input. The client module 151 may display, on the display 140, results of performing a plurality of operations of an application according to the plan. The client module 151 may sequentially display the results of performing a plurality of operations on the display 140. The user terminal 100 may display, on the display 140, only a portion of the results (e.g., result of performing a last operation) of performing a plurality of operations.

The client module 151 may receive, from the intelligence server 200, a request for obtaining information required for calculating a result corresponding to a voice input. The client module 151 may transmit the required information to the intelligence server 200 in response to the request.

The client module 151 may transmit, to the intelligence server 200, result information about results of performing a plurality of operations according to the plan. The intelligence server 200 may confirm that the received voice input has been correctly performed, using the result information.

The client module 151 may include a voice recognition module. The client module 151 may recognize, through the voice recognition module, a voice input for executing a limited function. The client module 151 may execute an intelligence application for processing a voice input by performing a systematic operation in response to a specified voice input (e.g., Wake up!).

The intelligence server 200 may receive information related to a user voice input from the user terminal 100 via a communication network. The intelligence server 200 may convert data related to a received voice input into text data. The intelligence server 200 may generate, based on the text data, at least one plan for performing a task corresponding to the user voice input.

The plan may be generated by an artificial intelligence (AI) system. The artificial intelligence system may be a rule-based system or a neural network-based system (e.g., a feedforward neural network (FNN) and/or a recurrent neural network (RNN)). Alternatively, the artificial intelligence system may be a combination of the foregoing systems or other artificial intelligence systems. The plan may be selected from a set of predefined plans or may be generated in real time in response to a user request. The artificial intelligence system may select at least one plan from among a plurality of predefined plans.

The intelligence server 200 may transmit a result according to a generated plan to the user terminal 100, or may transmit the generated plan to the user terminal 100. The user terminal 100 may display, on the display 140, a result according to a plan. The user terminal 100 may display, on the display 140, a result of performing an operation according to a plan.

The intelligence server 200 may include a front end 210, a natural language platform 220, a capsule database 230, an execution engine 240, an end user interface 250, a management platform 260, a big data platform 270, or an analytic platform 280.

The front end 210 may receive a voice input received from the user terminal 100. The front end 210 may transmit a response corresponding to the voice input to the user terminal 100.

The natural language platform 220 may include an automatic speech recognition (ASR) module 221, a natural language understanding (NLU) module 223, a planner module 225, a natural language generator (NLG) module 227, and/or a text-to-speech (TTS) module 229.

The automatic speech recognition module 221 may convert a voice input received from the user terminal 100 into text data. The natural language understanding module 223 may recognize an intention of a user using the text data of the voice input. The natural language understanding module 223 may recognize the intention of the user by performing syntactic analysis or semantic analysis. The natural language understanding module 223 may recognize a meaning of a word extracted from a voice input using a linguistic feature (e.g., syntactic element) of a morpheme or phrase, and may match the recognized meaning to an intention to determine the intention of the user.

The planner module 225 may generate a plan using the intention and parameter determined by the natural language understanding module 223. The planner module 225 may determine a plurality of domains required for performing a task, based on the determined intention. The planner module 225 may determine a plurality of operations included in each of the plurality of domains determined based on the intention. The planner module 225 may determine parameters required for performing the plurality of determined operations or result values output by performing the plurality of operations. The parameters and the result values may be defined as a concept of a specified form (or class). Accordingly, the plan may include a plurality of operations and/or a plurality of concepts determined according to the intention of the user. The planner module 225 may determine relationships between the plurality of operations and the plurality of concepts in stages (or hierarchically). The planner module 225 may determine, based on the plurality of concepts, an execution order of the plurality of operations determined based on the intention of the user. In other words, the planner module 225 may determine the execution order of the plurality of operations based on the parameters required for performing the plurality of operations and results output by performing the plurality of operations. Accordingly, the planner module 225 may generate a plan including association information (e.g., ontology) between the plurality of operations and the plurality of concepts. The planner module 225 may generate a plan using information stored in the capsule database 230, which stores a set of relationships between concepts and operations.

The natural language generator module 227 may change specified information into a text form. The information changed into a text form may have a form of a natural language utterance. The text-to-speech module 229 may change text-form information into voice-form information.

A portion or all of functions of the natural language platform 220 may be implementable in the user terminal 100.

The capsule database 230 may store information about relationships between a plurality of operations and concepts corresponding to a plurality of domains. A capsule may include a plurality of action objects (or action information) and concept objects (or concept information) included in a plan. The capsule database 230 may store a plurality of capsules in a form of a concept action network (CAN). The plurality of capsules may be stored in a function registry included in the capsule database 230.

The capsule database 230 may include a strategy registry, which stores strategy information required when determining a plan corresponding to a voice input. The strategy information may include reference information for determining one plan when there are a plurality of plans corresponding to a voice input. The capsule database 230 may include a follow-up registry, which stores follow-up operation information for suggesting a follow-up operation to the user in a specified situation. The follow-up operation may include a follow-up utterance. The capsule database 230 may include a layout registry, which stores layout information about information output through the user terminal 100. The capsule database 230 may include a vocabulary registry, which stores vocabulary information included in capsule information. The capsule database 230 may include a dialog registry, which stores dialog information about a dialog (or interaction) with the user. The capsule database 230 may update a stored object through a developer tool. The developer tool may include a function editor for updating an action object or a concept object. The developer tool may include a vocabulary editor for updating a vocabulary. The developer tool may include a strategy editor for generating and registering a strategy for determining a plan. The developer tool may include a dialog editor for generating a dialog with the user. The developer tool may include a follow-up editor for editing a follow-up utterance that activates a follow-up objective and provides a hint. The follow-up objective may be determined based on a currently set objective, user's preference, or environmental condition. The capsule database 230 may also be implementable in the user terminal 100.

The execution engine 240 may calculate a result using the generated plan. The end user interface 250 may transmit the calculated result to the user terminal 100. Accordingly, the user terminal 100 may receive the result and may provide the received result to the user. The management platform 260 may manage information used in the intelligence server 200. The big data platform 270 may collect data of the user. The analytic platform 280 may manage quality of service (QoS) of the intelligence server 200. The analytic platform 280 may manage elements and a processing speed (or efficiency) of the intelligence server 200.

The service server 300 may provide a specified service (e.g., food order or hotel reservation) to the user terminal 100. The service server 300 may be a server operated by a third party. The service server 300 may provide, to the intelligence server 200, information for generating a plan corresponding to a received voice input. The provided information may be stored in the capsule database 230. Furthermore, the service server 300 may provide result information according to a plan to the intelligence server 200.

In the above-described integrated intelligence system, the user terminal 100 may provide various intelligent services to the user in response to a user input. The user input may include an input via a physical button, a touch input, or a voice input.

The user terminal 100 may provide a voice recognition service through an intelligence application (or a voice recognition application) stored in the user terminal 100. In this case, the user terminal 100 may recognize a user utterance or voice input received through the microphone, and may provide a service corresponding to a recognized voice input to the user.

The user terminal 100 may perform, based on a received voice input, a specified operation alone or in combination with the intelligence server and/or service server. The user terminal 100 may execute an application corresponding to the received voice input, and may perform the specified operation through the executed application.

When the user terminal 100 provides a service in combination with the intelligence server 200 and/or the service server 300, the user terminal 100 may detect a user utterance using the microphone 120, and may generate a signal (or voice data) corresponding to the detected user utterance. The user terminal 100 may transmit the voice data to the intelligence server 200 using the communication interface 110.

The intelligence server 200 according to an embodiment may generate, as a response to a voice input received from the user terminal 100, a plan for performing a task corresponding to the voice input or a result of performing an operation according to the plan. The plan may include a plurality of operations for performing a task corresponding to a user voice input and/or a plurality of concepts related to the plurality of operations. The concepts may be definitions of parameters input for performing the plurality of operations or result values output by performing the plurality of operations. The plan may include association information between the plurality of operations and/or the plurality of concepts.

The user terminal 100 may receive the response using the communication interface 110. The user terminal 100 may output a voice signal generated in the user terminal 100 to the outside using the speaker 130, or may output an image generated in the user terminal 100 to the outside using the display 140.

Figure 2:
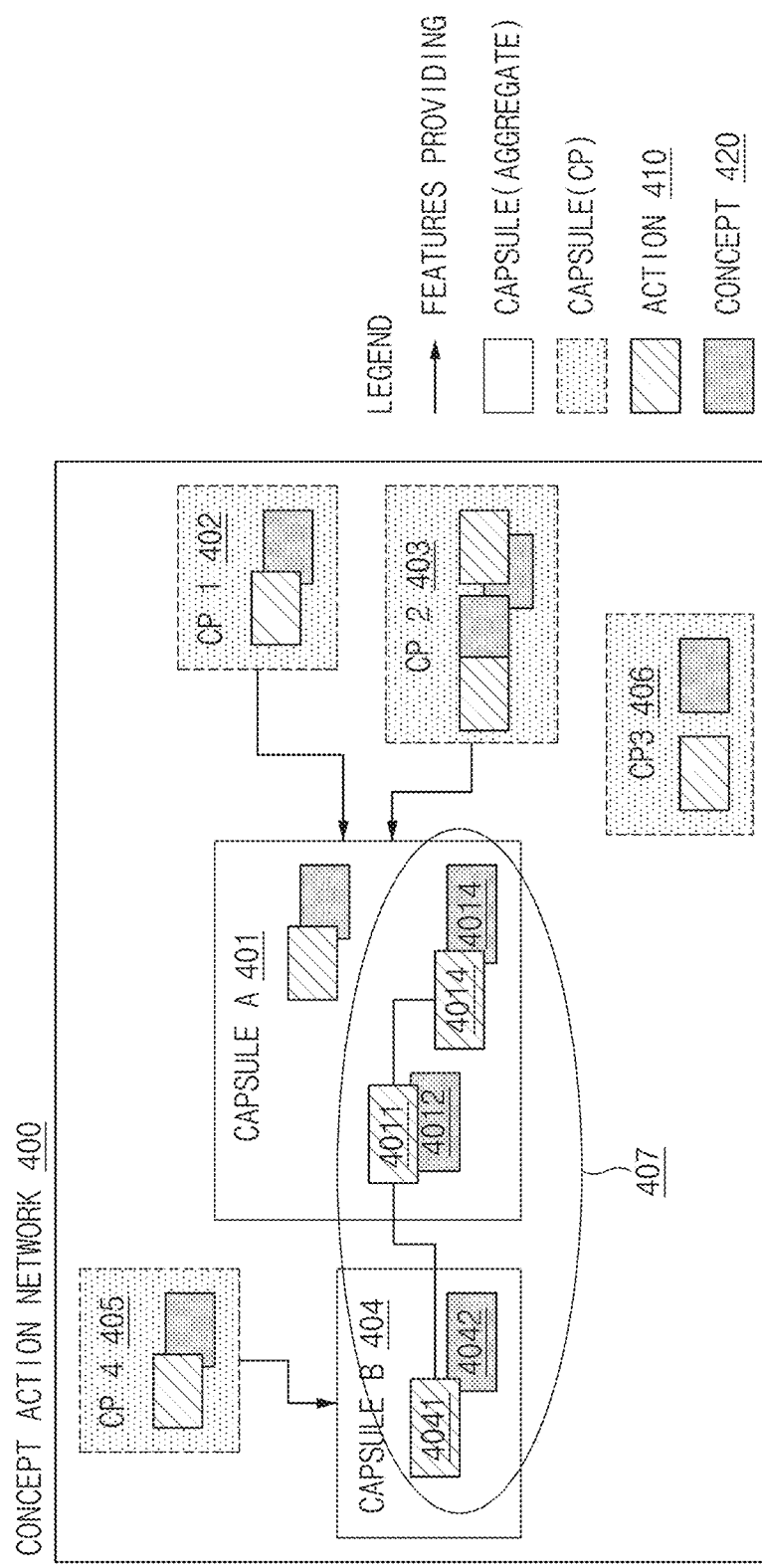
FIG. 2 is a diagram illustrating a form in which relationship information between a concept and an action is stored in a database, according to an embodiment.

FIG. 2 is a diagram illustrating a form in which relationship information between a concept and an operation is stored in a database, according to an embodiment. The database of FIG. 2 may be referred to as a concept action network 400.

The capsule database of the intelligence server 200 may store capsules in a form of a CAN. The capsule database may store an operation for performing a task corresponding to a user voice input and a parameter required for the operation in a form of a CAN.

The capsule database may store a plurality of capsules A 401 and B 404 corresponding to a plurality of domains (e.g., applications) respectively. According to an embodiment, a single capsule (e.g., capsule A 401) may correspond to a single domain (e.g., location (geography), application). Furthermore, at least one service provider (e.g., CP 1 402 or CP 2 403) for executing a function for a domain related to one capsule may correspond to the one capsule. A single capsule may include at least one operation 410 and at least one concept 420 for executing a specified function.

The natural language platform 220 may generate a plan for performing a task corresponding to a received voice input using a capsule included in the capsule database. The planner module 225 of the natural language platform 220 may generate a plan using a capsule stored in the capsule database. The planner module 225 may generate a plan 407 using operations 4011 and 4013 and concepts 4012 and 4014 of the capsule A 410 and an operation 4041 and concept 4042 of the capsule B 404.

Figure 3:
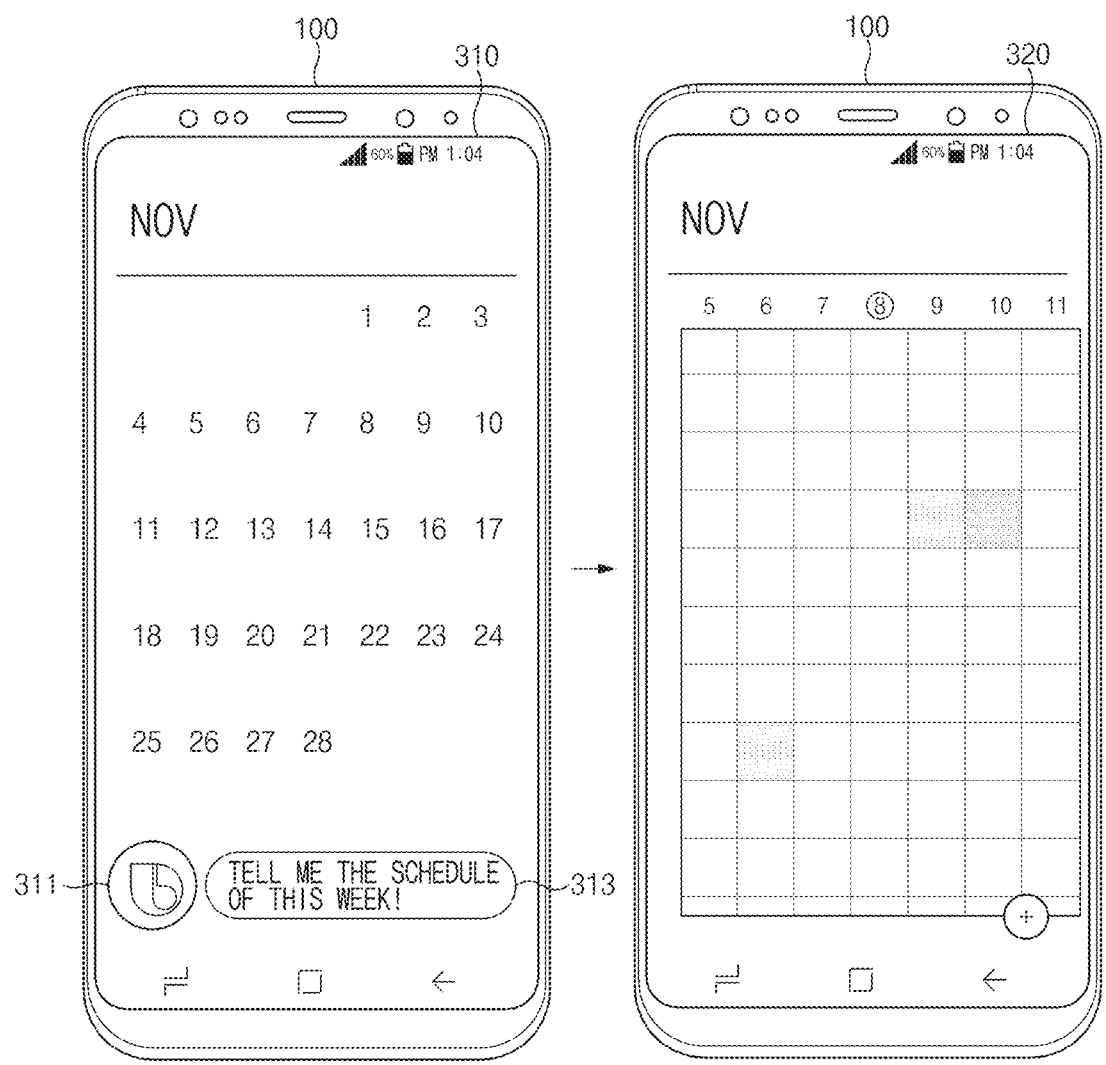
FIG. 3 is a diagram illustrating a user terminal which displays a screen in which a voice input received through an intelligence application is processed, according to an embodiment.

FIG. 3 is a diagram illustrating a screen in which a voice input received through an intelligence application is processed by a user terminal, according to an embodiment.

The user terminal 100 may execute an intelligence application for processing a user input through the intelligence server 200.

In a screen 310, when the user terminal 100 has recognized a specified voice input (e.g., Wake up!) or has received an input via a hardware key (e.g., dedicated hardware key), the user terminal 100 may execute an intelligence application for processing a voice input. The user terminal 100 may execute an intelligence application in a state in which a schedule application has been executed. The user terminal 100 may display, on the display 140, an object (e.g., an icon) 311 corresponding to an intelligence application. The user terminal 100 may receive a voice input caused by a user utterance. The user terminal 100 may receive a voice input "Tell me the schedule of this week!". The user terminal 100 may display, on the display, a user interface (UI) 313 (e.g., input window) of an intelligence application on which text data of the received voice input is displayed.

In a screen 320, the user terminal 100 may display, on the display, a result corresponding to the received voice input. The user terminal 100 may receive a plan corresponding to a received user input, and may display "schedule of this week" on the display according to the plan.

Figure 4:
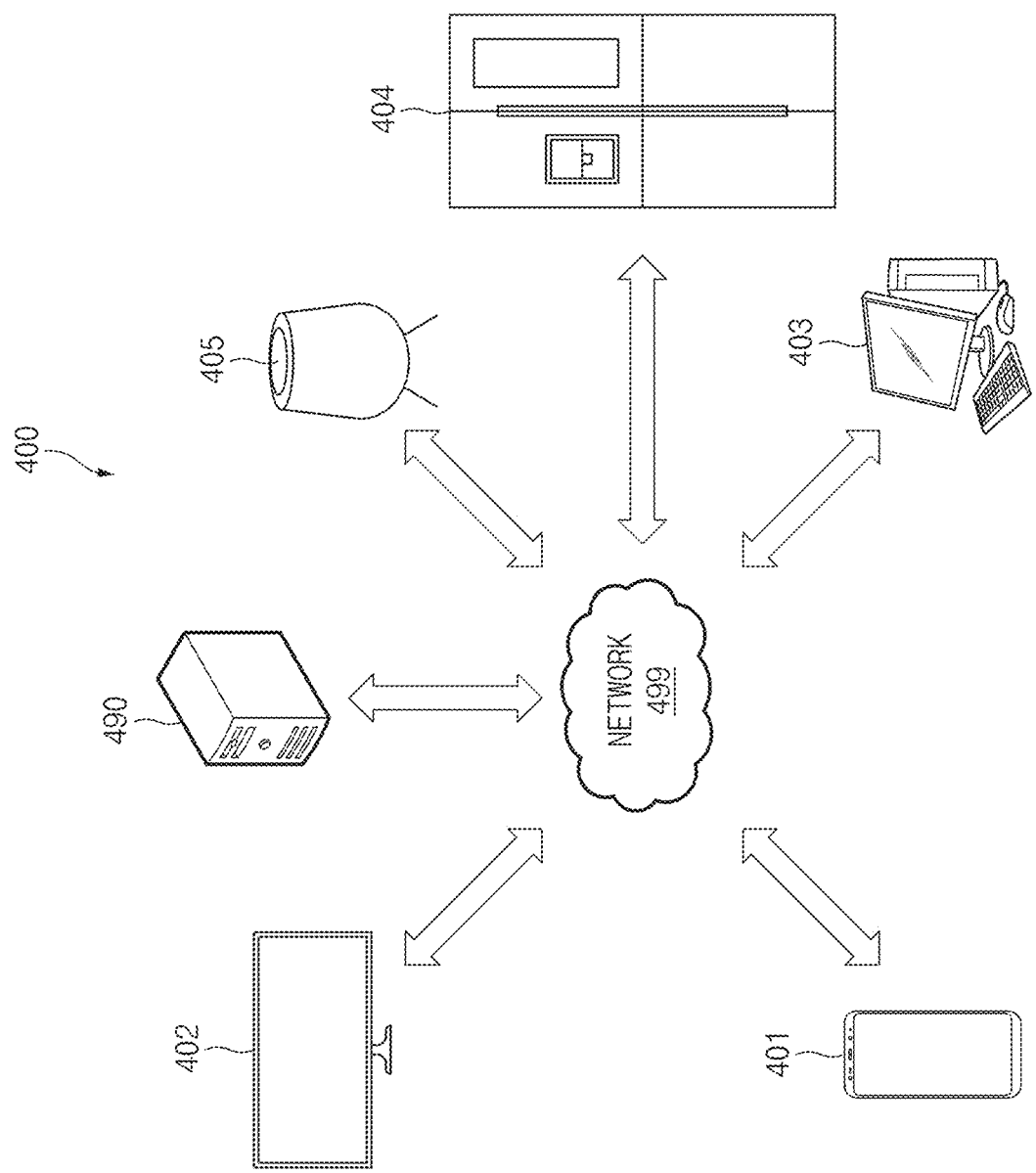
FIG. 4 illustrates a network environment including a plurality of devices, according to an embodiment.

FIG. 4 illustrates a network environment including a plurality of devices, according to an embodiment.

Referring to FIG. 4, various electronic devices may communicate via a network 499 (e.g., the Internet). The network environment may include a mobile device 451, a TV 452, a server device 490, a personal computer (PC) 453, a refrigerator 454, and/or an AI speaker 455. The server device 490 may include the intelligence server 200 of FIG. 1, the service server 300 of FIG. 1, and/or an Internet-of-things (IoT) server. The IoT server may be a server, which stores information (e.g., account information, type information about an electronic device, the name of an electronic device, and/or location information about an electronic device) about various electronic devices that support an Internet connection. Each of the mobile device 451, the TV 452, the PC 453, the refrigerator 454, and/or the AI speaker 455 may correspond to the user terminal 100 of FIG. 1, and may include a voice agent capable of processing a voice command. The mobile device 451 may correspond to the user terminal 100 of FIG. 1, and each of the TV 452, the PC 453, the refrigerator 454, and the AI speaker 455 may be an electronic device configured to be controlled on the basis of a signal from the server device 490 or mobile device 451.

The user may control another electronic device using the mobile device 451. The user may execute (e.g., call) the voice agent of the mobile device 451. The user may execute the voice agent by uttering a specified wake-up word. Upon receiving a voice from the user, the mobile device 451 may compare the voice with a wake-up model stored in the mobile device 451 to determine whether the specified wake-up word has been received. The mobile device 451 may determine whether the specified wake-up word has been received by processing the received voice and the wake-up model according to a specified algorithm (e.g., an HMM or artificial neural network).

The user may control the TV 452 using the mobile device 451. In the case where the specified wake-up word is "Hi Bixby", the user may utter the wording "Hi Bixby, turn on the TV". The mobile device 451 may execute the voice agent by recognizing the utterance of "Hi Bixby", and may perform a task corresponding to the wording "turn on the TV" using the voice agent. The voice agent may use information from the server device 490 in order to perform a task corresponding to the wording "turn on the TV".

The server device 490 may manage information about other devices and account information. The server device 490 may include the intelligence server 200 of FIG. 1, or may be implemented as a server that is separate from the intelligence server 200. The server device 490 may include a database including account information and information about a device associated with an account. The mobile device 451 may obtain, from the server device 490, information about other electronic devices (e.g., the television 452, the PC 453, the refrigerator 454, and the AI speaker 455) associated with the account of the mobile device 451. The information about other electronic devices may include identification information and/or capability information.

The voice agent of the mobile device 451 may transmit information (e.g., an audio file and/or text information converted from an audio file) corresponding to the wording "turn on the TV" to an external server (e.g., the intelligence server 200 of FIG. 1), and may receive a task and/or a path rule for performing a task from the external server. The mobile device 451 may obtain, from the server device 490, information about electronic devices associated with the account of the mobile device 451, and may control the TV 452 corresponding to a task among pieces of obtained information about electronic devices. The mobile device 451 may control the TV 452 by transmitting a signal to the TV 452 directly or via the server device 490.

Hereinafter, methods for controlling other electronic devices of an electronic device will be described. Although descriptions are focused on the mobile device 451 of FIG. 4, embodiments of the present disclosure are not limited thereto. In the case where other electronic devices (e.g., the TV 452, the PC 453, the refrigerator 454, and/or the AI speaker 455) support a voice agent, the other electronic devices may also control other electronic devices.

The network environment illustrated in FIG. 4 is merely an example, and embodiments of the present disclosure are not limited thereto. At least some of the electronic devices of the network environment may be omitted. The network environment may further include another electronic device.

Figure 5:
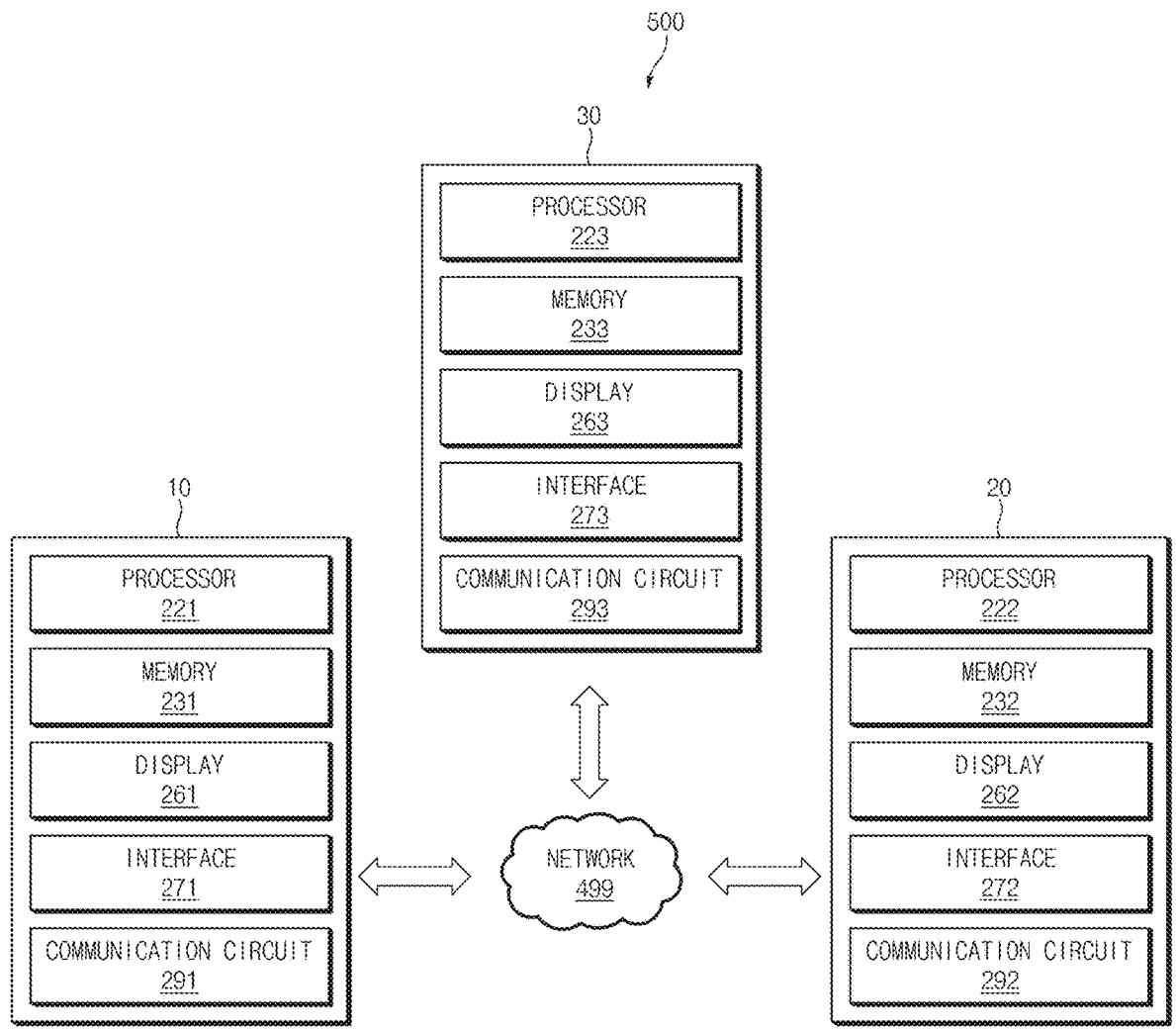
FIG. 5 is a block diagram illustrating electronic devices, according to an embodiment.

FIG. 5 is a block diagram illustrating electronic devices, according to an embodiment.

A first electronic device 10 may include a processor 521, a memory 531, a display 561, an interface 571, and/or a communication circuit 591.

The processor 521 may be operatively connected to the memory 531, the display 561, the interface 571, and/or the communication circuit 591, and may perform various operations according to one or more instructions stored in the memory 531. An operation performed by the first electronic device 10 may be referred to as an operation performed by the processor 521. The processor 521 may include a first processor and a second processor. The first processor may have relatively low power consumption compared to the second processor. The first processor may be configured to perform a specified function while being continuously supplied with power even when the first electronic device 10 is in an idle state. The second processor may be supplied with first power when the first electronic device 10 is in the idle state, and may be supplied with second power higher than the first power when the first electronic device 10 is in an active state. The second processor may be an application processor of the first electronic device 10. The first processor may determine whether a wake-up word is received, and may wake up the second processor when reception of the wake-up word is determined. Reception of the wake-up word may be processed by the second processor.

The memory 531 may be operatively connected to the processor 521, and may store one or more instructions that, when executed, cause the processor 521 to perform various operations. The memory 531 may store information about the first electronic device 10 and another electronic device (e.g., a second electronic device 20 and/or a third electronic device 30). The information about an electronic device may include the type of an electronic device, an identifier of an electronic device, location information about an electronic device, account information associated with an electronic device, and/or capability information about an electronic device.

The display 561 may include at least one pixel, and may be configured to display an image using the at least one pixel. The display 561 may include a touchable layer. In an embodiment, the display 561 may be omitted.

The interface 571 may include a circuit for interfacing with the user. The interface 571 may include an audio reception circuit (e.g., at least one microphone) and an audio output circuit (e.g., at least one speaker). The interface 571 may include a touch screen (e.g., the display 561). The interface 571 may include at least one physical button for receiving a user input. The interface 571 may include a controller (e.g., a keyboard, a wireless microphone, a joystick, a joypad, and/or a mouse) physically and/or operatively connectable to the first electronic device 10. The controller may be referred to as a human interface device.

The communication circuit 591 may provide a wired/wireless interface with another electronic device. The communication circuit 591 may provide communication based on Bluetooth, Bluetooth low energy (BLE), WiFi, ultra-wide band (UWB), neighbor awareness network (NAN), wireless local area network (WLAN), and/or cellular network. The first electronic device 10 may use the communication circuit 591 to communicate with the second electronic device 20 and/or the third electronic device 30 based on Bluetooth (e.g., Bluetooth legacy or BLE) and may communicate with an external server based on a cellular network.

Each of the second electronic device 20 and the third electronic device 30 may be regarded as having a structure similar to that of the first electronic device 10. For convenience, overlapping descriptions may be omitted. Descriptions of the processor 521 may be referenced for processors 522 and 523. Descriptions of the memory 531 may be referenced for memories 532 and 533. Descriptions of the display 561 may be referenced for displays 562 and 563. Descriptions of the interface 571 may be referenced for interfaces 572 and 573. Descriptions of the communication circuit 591 may be referenced for communication circuits 592 and 593.

Upon receiving a wake-up utterance, the first electronic device 10 may receive location information about a surrounding electronic device. The first electronic device 10 may receive the wake-up utterance via the interface 571. If the wake-up utterance is received, the first electronic device 10 may transmit (e.g., broadcast) a request signal for requesting location information using the communication circuit 591. Upon receiving a response signal for the request signal, the first electronic device 10 may update location information about a surrounding electronic device using the response signal. The first electronic device 10 may transmit information about a command utterance received from the user and updated location information to a server. The first electronic device 10 may make it possible to track the location of a surrounding electronic device by updating and transmitting the location information about surrounding electronic devices upon reception of the wake-up utterance.

Upon receiving the wake-up utterance, the first electronic device 10 may receive location information and audio information about a surrounding electronic device. The first electronic device 10 may receive the wake-up utterance via the interface 571. If the wake-up utterance is received, the first electronic device 10 may transmit (e.g., broadcast) a request signal for requesting location information and audio information using the communication circuit 591. The request signal may include the location information about the first electronic device 10 and audio information (e.g., reliability of the wake-up utterance, signal-to-noise ratio (SNR) of the wake-up utterance, and/or received sound volume information about the wake-up utterance). Upon receiving a response signal for the request signal, the first electronic device 10 may update location information about a surrounding electronic device using the response signal. The first electronic device 10 may determine a device for transmitting a user utterance to a server using the response signal. When the first electronic device 10 is determined to transmit the user utterance and location information, the first electronic device 10 may transmit information about a command utterance received from the user and updated location information to a server. When the second electronic device 20 is determined to transmit the user utterance and location information, the second electronic device 20 may transmit information about a command utterance received from the user and updated location information to a server.

The first electronic device 10 may process the command utterance. Upon receiving the command utterance, the first electronic device 10 may determine whether location information is included in the command utterance. In the case where the utterance includes the location information, the first electronic device 10 may determine an electronic device to be controlled, based on the location information and updated location information. In the case where the utterance does not include the location information, the first electronic device 10 may determine an electronic device to be controlled, based on contents of the command utterance, the location of the first electronic device 10, and/or updated location information. The first electronic device 10 may transmit information about an electronic device to be controlled to a server using the communication circuit 591. The first electronic device 10 may transmit the contents of the command utterance and information about the command utterance together with the information about an electronic device to be controlled. The first electronic device 10 may transmit the information about the command utterance to an electronic device to be controlled, using the communication circuit 591. Hereinafter, an electronic device to be controlled may be referred to as a "target device".

A plurality of electronic devices (e.g., the first electronic device 10, the second electronic device 20, and/or the third electronic device) and a server device may constitute a single control system. Each of the plurality of electronic devices may be configured to broadcast, upon receiving a wake-up utterance, a response signal including location information and audio characteristic information corresponding to the wake-up utterance. Each of the plurality of electronic devices may determine an utterance location of the user using the response signal, and may determine an electronic device corresponding to the utterance location of the user among the plurality of electronic devices. The electronic device corresponding to the utterance location may be configured to receive a command utterance from the user and transmit the utterance location and information about the command utterance to the server device. The server device may receive the utterance location and the information about the command utterance, and may determine a target device associated with the command utterance based on the utterance location and the information about the command utterance. The server device may control the target device so that the target device performs an operation associated with the command utterance.

Hereinafter, embodiments of the present disclosure will be described with reference to FIGS. 6 to 14. Although the following descriptions are provided in relation to the first electronic device 10, operations of the first electronic device 10 may be performed by the second electronic device 20 or the third electronic device 30. Furthermore, for convenience, the first electronic device 10 is illustrated as a mobile device, the second electronic device 20 is illustrated as an air conditioner, and the third electronic device 30 is illustrated as a TV, but embodiments of the present disclosure are not limited thereto. Each of the first electronic device 10, the second electronic device 20, and the third electronic device 30 may be any electronic device that may be controlled based on a signal received from an external electronic device.

Figure 6:
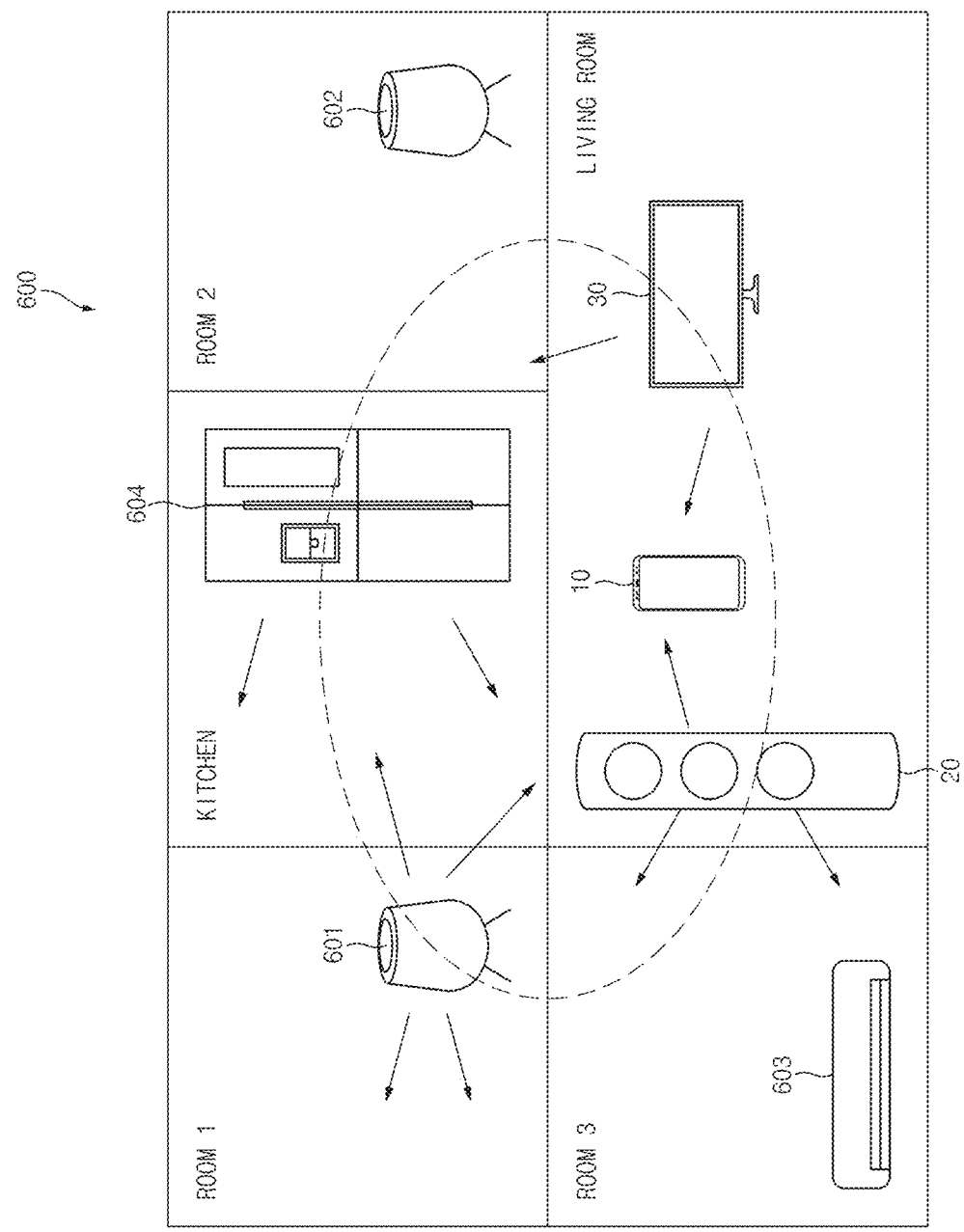
FIG. 6 illustrates a layout environment of electronic devices, according to an embodiment.

FIG. 6 illustrates a layout environment 600 of electronic devices, according to an embodiment.

In FIG. 6, the first electronic device 10 (e.g., a mobile device), the second electronic device 20 (e.g., an air conditioner), and the third electronic device 30 (e.g., a TV) may be located in a living room. A first AI speaker 601 may be arranged in a room 1, and a second AI speaker 602 may be arranged in a room 2. An air conditioner 603 may be located in a room 3, and a refrigerator 604 may be located in a kitchen. The layout environment 600 of FIG. 6 is an example for providing descriptions, and embodiments of the present disclosure are not limited to the layout environment 600.

When a specified signal or command is received, the electronic devices (e.g., 10, 20, 30, 601, 602, 603, and/or 604) of FIG. 6 may transmit their own information so as to share their own information with another electronic device. The specified signal or command may be referred to as a request signal (e.g., triggering signal). When the electronic devices are moved to a new place, are powered on, or receive a wake-up utterance from the user, the electronic devices may transmit the request signal. The electronic devices may collect information about a surrounding electronic devices by transmitting (e.g., broadcasting) the request signal. The electronic devices may add their own information to the request signal so as to share their own information with other electronic devices by transmitting the request signal.

Referring to FIG. 6, the first electronic device 10 may broadcast the request signal. The first electronic device 10 may broadcast the request signal in response to reception of a wake-up utterance of the user. The first electronic device 10 may broadcast the request signal based on Bluetooth, WiFi, WLAN, and/or UWB. The request signal may include information about the first electronic device 10. The information about the first electronic device 10 may include information (e.g., identifier) for identifying the first electronic device 10, type information (e.g., information about mobility of the first electronic device) about the first electronic device 10, and/or location information about the first electronic device 10. The request signal may include the information about the first electronic device 10 and audio information. The audio information may include information (e.g., received sound volume, SNR, and/or reliability) about the wake-up utterance obtained by the first electronic device 10.

In FIG. 6, the request signal broadcast by the first electronic device 10 may be received by the second electronic device 20, the third electronic device 30, the first AT speaker 601, and the refrigerator 604. Each of the second electronic device 20, the third electronic device 30, the first AI speaker 601, and the refrigerator 604 may broadcast a response signal in response to reception of the request signal. Each of the second electronic device 20, the third electronic device 30, the first AI speaker 601, and the refrigerator 604 may broadcast the response signal based on Bluetooth, WiFi, WLAN, and/or UWB. The response signal transmitted from the second electronic device 20 may include information about the second electronic device 20. The information about the second electronic device 20 may include information (e.g., identifier) for identifying the second electronic device 20, type information (e.g., information about mobility of the second electronic device 20) about the second electronic device 20, and/or location information about the second electronic device 20. The response signal may include the information about the second electronic device 20 and audio information. The audio information may include information (e.g., received sound volume, SNR, and/or reliability) about the wake-up utterance obtained by the second electronic device 20.

Reception strengths of the response signals may be different from each other. The reception strength of the response signal transmitted from the first AI speaker 601 in the first electronic device 10 may be lower than the reception strengths of the response signals received from other electronic devices (e.g., the second electronic device 20, the third electronic device 30, and the refrigerator 604). Due to a structure (e.g., a wall) between the room 1 and the living room, the reception strength of the response signal transmitted from the first AI speaker 601 may be relatively low.

The first electronic device 10 may determine the location of the first electronic device 10 or an utterance location based on the response signals received from surrounding electronic devices. The first electronic device 10 may determine the location of the first electronic device 10 or the utterance location based on the reception strengths of the response signals and information about the response signals. In FIG. 6, the first electronic device 10 may receive a relatively high-strength response signal from the refrigerator 604 and may receive relatively high-strength response signals from the second electronic device 20 and the third electronic device 30. In this case, the first electronic device 10 may determine that the first electronic device 10 is located in the living room or kitchen. The first electronic device 10 may obtain location information of "kitchen" from the response signal of the refrigerator 604, and may obtain location information of "living room" from the response signals of the second electronic device 20 and the third electronic device 30. Information about each electronic device may be included in the response signals. The first electronic device 10 may obtain the location information about the refrigerator 604 from a memory or server, and may determine that the first electronic device 10 is present at a location (e.g., living room) adjacent to the refrigerator 604 based on the strength of the response signal of the refrigerator 604. Likewise, the first electronic device 10 may determine that the first electronic device 10 is present at a location (e.g., a kitchen or living room) adjacent to the refrigerator 604, the second electronic device 20, and the third electronic device 30. The first electronic device 10 may determine that the first electronic device 10 is relatively far from the room 1 since the reception strength of the response signal received from the first AI speaker 601 is relatively low. Therefore, the first electronic device 10 may determine that the first electronic device 10 is located in the living room among the kitchen and the living room. The first electronic device 10 may obtain information about the layout environment 600 from a memory or server. The first electronic device 10 may determine the location of the first electronic device 10 from the information about the layout environment 600 and the response signal. The information about the layout environment 600 may include the location information about the electronic device in the layout environment 600 and/or information about a structure of the layout environment 600.

Figure 7:
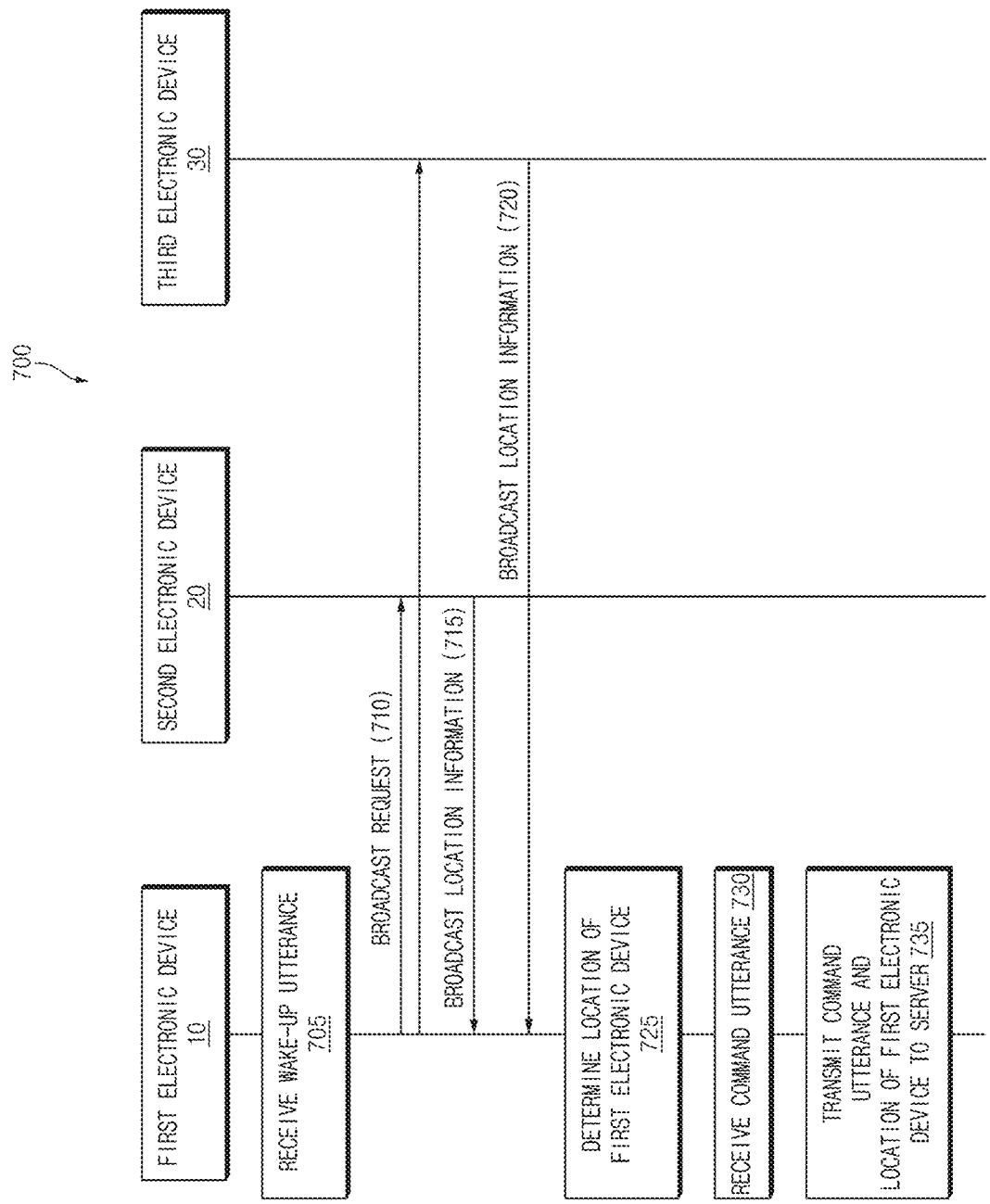
FIG. 7 illustrates a signal flowchart of a voice command processing method, according to an embodiment.

FIG. 7 illustrates a signal flowchart 700 of a voice command processing method, according to an embodiment.

With regard to the example of FIG. 7, for convenience, the voice command processing method will be described in relation to the first electronic device 10, the second electronic device 20, and the third electronic device 30. In FIG. 7, the first electronic device 10 may support the voice agent, but the second electronic device 20 and the third electronic device 30 may not support the voice agent.

At step 705, the first electronic device 10 may receive a wake-up utterance. The first electronic device 10 may receive an audio signal using an interface, and may receive the wake-up utterance by recognizing the wake-up utterance based on the audio signal.

At step 710, the first electronic device 10 may broadcast a request signal. As described above with reference to FIG. 6, the first electronic device 10 may broadcast the request signal based on Bluetooth, WiFi, WLAN, and/or UWB. The request signal may include information (e.g., information for identifying the first electronic device 10, type information about the first electronic device 10, and/or location information about the first electronic device 10) about the first electronic device 10.

At step 715, the second electronic device 20 may broadcast a response signal in response to the request signal. The second electronic device 20 may broadcast the response signal if the information about the first electronic device 10 included in the request signal satisfies a specified condition (e.g., electronic device associated with the same account as the second electronic device 20). The response signal transmitted from the second electronic device 20 may include information (e.g., information for identifying the second electronic device 20, type information about the second electronic device 20, and/or location information about the second electronic device 20) about the second electronic device 20. The information about the second electronic device 20 may be information obtained from a memory of the second electronic device 20 or a server device. The location information about the second electronic device 20 may be set by the user or may be determined (e.g., determined using a method similar to that of the first electronic device 10) by the second electronic device 20 based on the request signal and response signal.

At step 720, the third electronic device 30 may broadcast a response signal in response to the request signal. The third electronic device 30 may broadcast the response signal if the information about the first electronic device 10 included in the request signal satisfies a specified condition (e.g., electronic device associated with the same account as the third electronic device 30). The response signal transmitted from the third electronic device 30 may include information (e.g., information for identifying the third electronic device 30, type information about the third electronic device 30, and/or location information about the third electronic device 30) about the third electronic device 30. For example, the information about the third electronic device 30 may be information obtained from a memory of the third electronic device 30 or a server device. The location information about the third electronic device 30 may be set by the user or may be determined (e.g., determined using a method similar to that of the first electronic device 10) by the third electronic device 30 based on the request signal and response signal.

At step 725, the first electronic device 10 may determine the location of the first electronic device 10. The first electronic device 10 may determine the location of the first electronic device 10 based on the response signal received from the second electronic device 20 and the response signal received from the third electronic device 30.

The first electronic device 10 may determine the location of the first electronic device 10 based on the reception strength of the response signal of the second electronic device 20, location information of the response signal (hereinafter referred to as a second response signal) of the second electronic device 20, the reception strength of the response signal of the third electronic device 30, and location information of the response signal (hereinafter referred to as a third response signal) of the third electronic device 30. The second response signal may indicate a living room as the location information, and the third response signal may indicate a kitchen as the location information. When the reception strength of the second response signal is higher than the reception strength of the third response signal, the first electronic device 10 may determine that the first electronic device 10 is located in the living room.

At step 730, the first electronic device 10 may receive a command utterance. The first electronic device 10 may provide visual and/or auditory feedback in response to reception (e.g., step 705) of the wake-up utterance. The user may perform command utterance according to the feedback. The user may utter a command after giving the wake-up utterance. Although FIG. 7 illustrates that reception of the command utterance is performed after step 725, embodiments of the present disclosure are not limited thereto. Reception of the command utterance may be performed at an arbitrary time after receiving (e.g., step 705) the wake-up utterance.

At step 735, the first electronic device 10 may transmit the command utterance and the location of the first electronic device 10 to a server. The first electronic device 10 may update the location of the first electronic device 10 by transmitting determined location information about the first electronic device 10 to the server. The first electronic device 10 may transmit audio data corresponding to the command utterance and/or text data corresponding to the command utterance to the server. The server may update the location information about the first electronic device 10 stored in the server using the location information received from the first electronic device 10. The server may determine an intention of the user by using the command utterance and the location information about the first electronic device 10. The server may generate information (e.g., path rule or command) based on the intention of the user, and may transmit the generated information to a target device.

Referring back to FIG. 6, the command utterance may read "turn on the air conditioner". The first electronic device 10 may determine the location of the first electronic device 10 as the living room based on the response signals of the second electronic device 20 and the third electronic device 30. The first electronic device 10 may transmit, to the server, information corresponding to the wording "turn on the air conditioner" together with the determined location information indicating the living room. The server may confirm that the target device is an air conditioner from the command utterance. Furthermore, the server may confirm that an air conditioner associated with the account of the first electronic device 10 includes the second electronic device 20 and the air conditioner 603. In this case, the server may determine, from the location information (e.g., living room) about the first electronic device 10, that the intention of the user is to power off the second electronic device 20 located in the living room. The server may transmit information for powering off the second electronic device 20 to the second electronic device 20.

Figure 8:
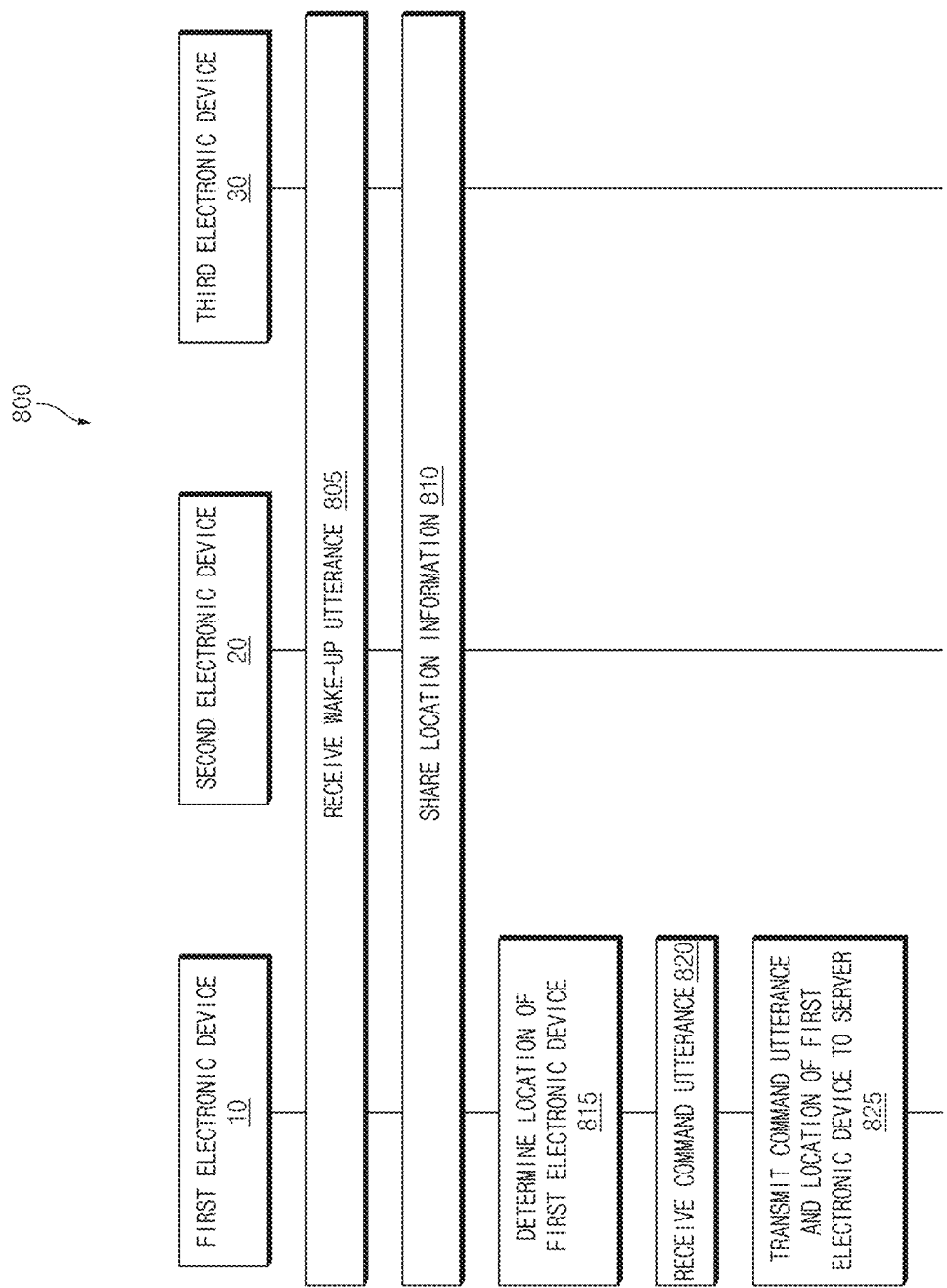
FIG. 8 illustrates a signal flowchart of a voice command processing method, according to an embodiment.

FIG. 8 illustrates a signal flowchart 800 of a voice command processing method, according to an embodiment.

With regard to the example of FIG. 8, for convenience, the voice command processing method will be described in relation to the first electronic device 10, the second electronic device 20, and the third electronic device 30. In FIG. 8, the first electronic device 10, the second electronic device 20, and the third electronic device 30 may support a voice agent.

At step 805, the first electronic device 10, the second electronic device 20, and the third electronic device 30 may receive a wake-up utterance.

At step 810, the first electronic device 10, the second electronic device 20, and the third electronic device 30 may share location information. Each of the first electronic device 10, the second electronic device 20, and the third electronic device 30 may broadcast a response signal including location information in response to the wake-up utterance. In FIG. 8, the response signal may include information about a transmission electronic device and audio information. The response signal of the first electronic device 10 may include information (e.g., information for identifying the first electronic device 10, type information about the first electronic device 10, and/or location information about the first electronic device 10) about the first electronic device 10 and audio information (e.g., received sound volume, SNR, and/or reliability of a wake-up utterance obtained by the first electronic device 10).

At step 815, the first electronic device 10 may determine an utterance location and the location of the first electronic device 10. By sharing (e.g., step 810) the location information, each of the first electronic device 10, the second electronic device 20, and the third electronic device 30 may determine the utterance location or a device closest to the utterance location. The first electronic device 10, the second electronic device 20, the third electronic device 30 may determine the utterance location or a device closest to the utterance location by comparing audio information. In FIG. 8, the first electronic device 10 may be determined as an electronic device closest to the utterance location based on the audio information. The received sound volume, SNR, or reliability of the audio information included in response signal of the first electronic device 10 may be higher than those of the audio information included in response signal of another electronic device. Furthermore, the first electronic device 10 may determine the location of the first electronic device 10 according to operation 725 of FIG. 7.

At step 820, the first electronic device 10 may receive a command utterance. Although FIG. 8 illustrates that reception of the command utterance is performed after step 810, embodiments of the present disclosure are not limited thereto. For example, reception of the command utterance may be performed at an arbitrary time after receiving (e.g., step 805) the wake-up utterance.

In FIG. 8, the first electronic device 10, the second electronic device 20, and the third electronic device 30 may determine the first electronic device 10 as an electronic device for processing the command utterance. In this case, the second electronic device 20 and the third electronic device 30 may not respond to the command utterance even if the command utterance is received.

At step 825, the first electronic device 10 may transmit the command utterance and the location of the first electronic device 10 to a server. The first electronic device 10 may transmit the command utterance and the location of the first electronic device 10 to the server according to step 735 of FIG. 7.

Figure 9:
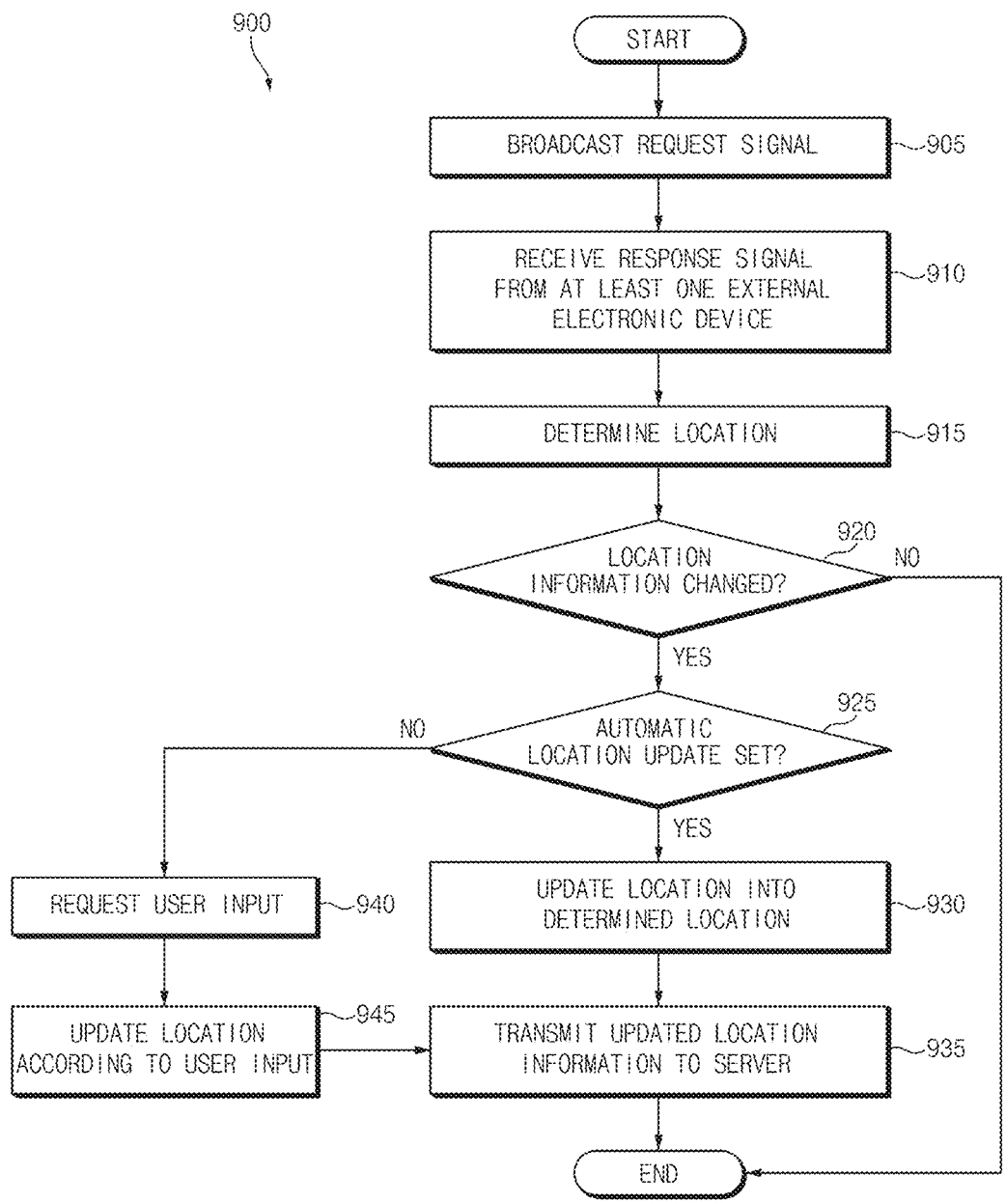
FIG. 9 illustrates a flowchart of a location updating method, according to an embodiment.

FIG. 9 illustrates a flowchart 900 of a location updating method, according to an embodiment.

At step 905, the first electronic device 10 may broadcast a request signal. The first electronic device 10 may broadcast the request signal when a wake-up utterance is received, when the first electronic device 10 is powered on, when a user request is received, or according to a specified interval. The first electronic device 10 may broadcast the request signal based on Bluetooth, WiFi, WLAN, and/or UWB. For example, the request signal may include information about the first electronic device 10.

At step 910, the first electronic device 10 may receive a response signal from at least one external electronic device. The first electronic device 10 may receive the response signal according to step 715 of FIG. 7.

At step 915, the first electronic device 10 may determine a location. The first electronic device 10 may determine the location of the first electronic device 10 and/or the location of at least one external electronic device. The first electronic device 10 may determine the location based on the response signal received from at least one external electronic device, location information included in the response signal, and/or the reception strength of the response signal. Examples of location determination of the first electronic device 10 are the same as the examples described above with reference to FIGS. 7 and 8. If a previously received response signal of an external electronic device is not received at the location of the first electronic device 10 determined based on the location information of the response signal and the reception strength of the response signal, the first electronic device 10 may determine that the external electronic device is turned off or the location of the external electronic device has changed. If a response signal of a new external electronic device, which has not been previously received, is received at the location of the first electronic device 10 determined based on the location information of the response signal and the reception strength of the response signal, the first electronic device 10 may determine to add the external electronic device.

At step 920, the first electronic device 10 may determine whether location information is changed. When there is no change in the locations of the first electronic device 10 and an external electronic device (e.g., step 920-N), the first electronic device 10 may end the method of FIG. 9 without updating location information. When there is a change in the location of the first electronic device or an external electronic device (e.g., step 920-Y), the first electronic device 10 may determine whether automatic location update is set at step 925. The first electronic device 10 may provide an interface for setting automatic location update as illustrated in FIG. 10.

Figure 10:
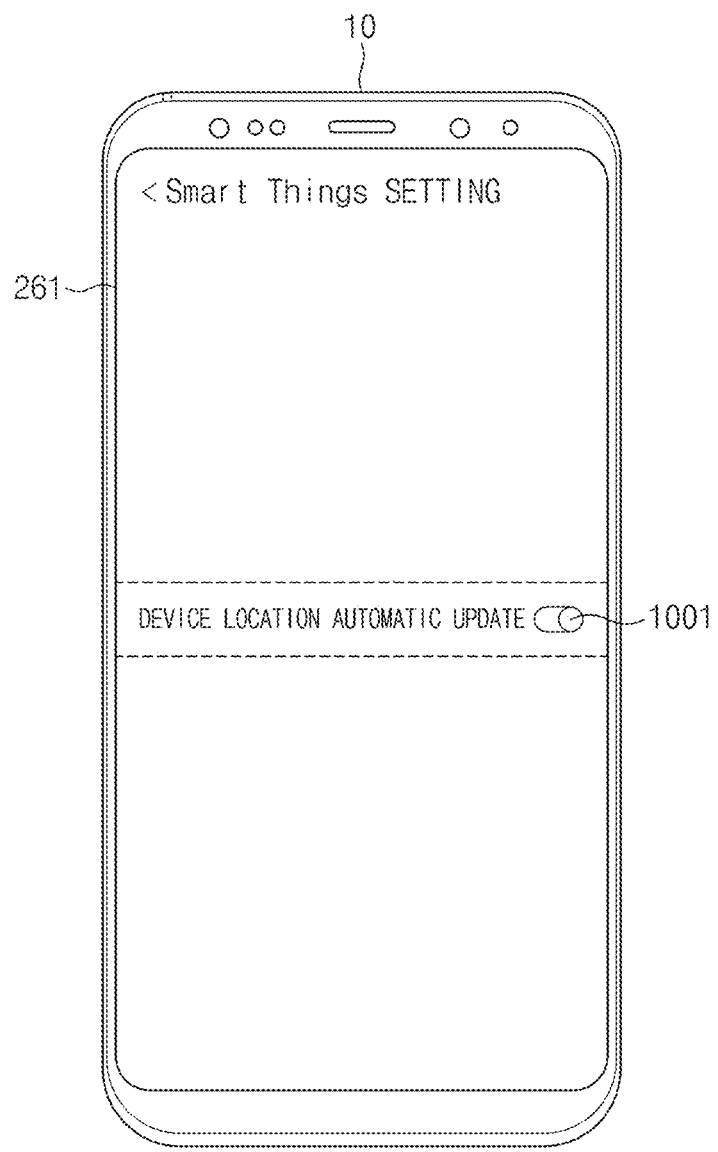
FIG. 10 illustrates a user interface for automatic location update, according to an embodiment.

FIG. 10 illustrates a user interface for automatic location update, according to an embodiment.

The first electronic device 10 may provide, on the display 561, a user interface 1001 for automatic location update. The user interface 1001 may include at least one button for activating or deactivating a setting of the first electronic device 10.

Referring back to FIG. 9, when the automatic location update is set (e.g., step 925-Y), the first electronic device 10 may update a location into a determined location. The first electronic device 10 may update location information (e.g., the location of the first electronic device 10 and/or the location of an external electronic device) stored in a memory of the first electronic device 10 into a location determined according to step 915.

At step 935, the first electronic device 10 may transmit updated location information to a server. The server may update the location information stored in the server by transmitting the location information to the server.

When the automatic location update is not set (e.g., step 925-N), the first electronic device 10 may request a user input at step 940. The first electronic device 10 may inquire of the user about whether changed location information about an electronic device is correct. When it is determined that the location of the second electronic device 20 has been changed from a living room to a kitchen, the first electronic device 10 may inquire of the user about whether the location of the second electronic device 20 is the kitchen. The first electronic device 10 may inquire of the user about the location using an expression such as the question "Is the second electronic device 20 placed in the living room?". The first electronic device 10 may request the user to input changed location information about an electronic device. When a response signal of a new electronic device, which has not been previously registered, is received, the first electronic device 10 may request the user to input location information about the new electronic device. The first electronic device 10 may inquire of the user about the location using an expression such as the question "Is the new electronic device placed in the living room?". At step 945, the first electronic device 10 may update the location of an electronic device (e.g., the first electronic device 10 and/or another electronic device) according to a user input. When the location is updated according to the user input, the first electronic device 10 may transmit updated location information to the server at step 935.

Although the method of FIG. 9 has been described in relation to the first electronic device 10, embodiments of the present disclosure are not limited thereto. The second electronic device 20 and the third electronic device 30 may also perform the method of FIG. 9. In this case, a plurality of electronic devices may update the locations of electronic devices present in the same space. The server may use location information received from the plurality of electronic devices so as to obtain spatial information (e.g., a structure of a space and/or location information about electronic devices in a space) about the space. Crowd-sourcingbased update of location information may be performed using the location information received from the plurality of electronic devices.

Figure 11:
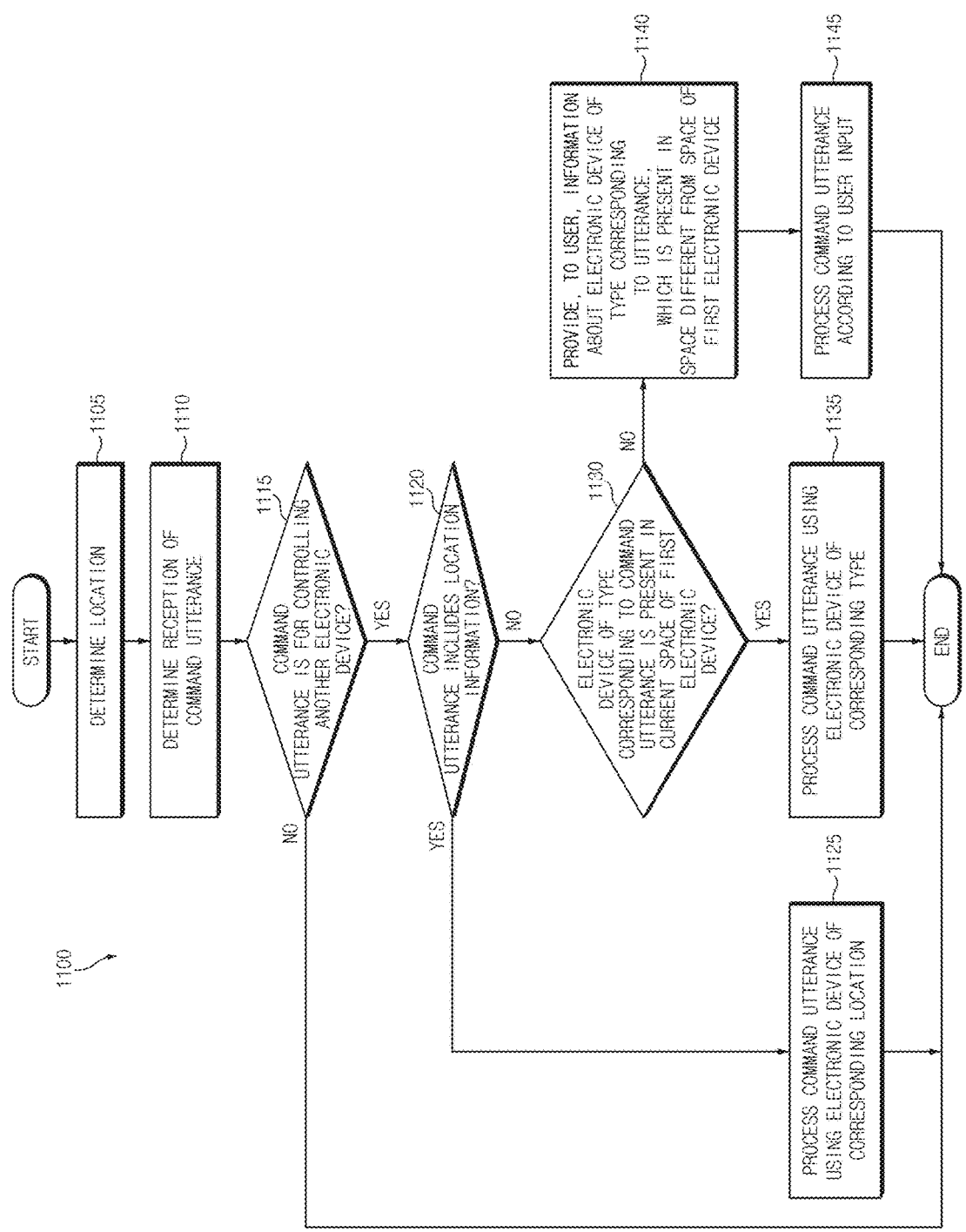
FIG. 11 illustrates a flowchart of a voice command processing method, according to an embodiment.

FIG. 11 illustrates a flowchart 1100 of a voice command processing method, according to an embodiment.

In the case where multiple electronic devices are present in the same space (e.g., a home or office) when the user attempts to control an electronic device through utterance, the user's utterance may not be processed according to an intention of the user. The user may not specify exact location information or a name of an electronic device through utterance. The first electronic device 10 may process the user's utterance according to the method described below.

At step 1105, the first electronic device 10 may determine the location of the first electronic device 10. For example, the first electronic device 10 may determine the location of the first electronic device 10 in response to reception of a wake-up utterance. The first electronic device 10 may determine the location of the first electronic device 10 according to step 725 of FIG. 7.

At step 1110, the first electronic device 10 may receive a command utterance. At step 1115, the first electronic device 10 may determine whether the command utterance is for controlling another electronic device. The first electronic device 10 may receive the command utterance and may determine whether the command utterance is for controlling another electronic device based on natural language analysis on the command utterance. When the command utterance is not for controlling another electronic device (e.g., step 1115-N), the first electronic device 10 may process the command utterance in the first electronic device 10.

When the command utterance is for controlling another electronic device (e.g., step 1115-Y), the first electronic device 10 may determine whether the command utterance includes location information at step 1120. The first electronic device 10 may determine whether the command utterance includes location information based on natural language analysis on the command utterance.

When the command utterance includes location information (e.g., step 1120-Y), the first electronic device 10 may process the command utterance using an electronic device disposed in a location specified by the command utterance at step 1125. Referring to FIG. 6, the command utterance of the user may read "play music in the room 2". In this case, the first electronic device 10 may play music using the second AI speaker 602 of the room 2. The first electronic device 10 may control, via an external server, the second AI speaker 602 so that the second AI speaker 602 plays music. The first electronic device 10 may control, via direct communication with the second AI speaker 602, the second AI speaker 602 so that the second AI speaker 602 plays music.

When the command utterance does not include location information (e.g., step 1120-N), the first electronic device 10 may determine whether an electronic device of a type corresponding to the command utterance is present in a current space of the first electronic device 10 at step 1130. The current space of the first electronic device 10 may be a logical or physical space to which the first electronic device 10 belongs. In FIG. 6, the space of the first electronic device 10 may be the living room. The electronic device of the type corresponding to the command utterance may be an electronic device corresponding to the name of an electronic device included in the command utterance or an electronic device capable of performing an operation indicated by the command utterance.

When the electronic device of the type corresponding to the command utterance is present in the space of the first electronic device 10 (e.g., step 1130-Y), the first electronic device 10 may process the command utterance using the electronic device of the type corresponding to the command utterance at step 1135. In FIG. 6, the command utterance of the user may read "turn on the air conditioner". In this case, the second electronic device 20, which is the electronic device of the type corresponding to the command utterance, may be present in the living room that is the space of the first electronic device 10. The first electronic device 10 may process the command utterance using the second electronic device 20. The first electronic device 10 may process the command utterance by communicating with the second electronic device 20 directly or via an external server.

When the electronic device of the type corresponding to the command utterance is not present in the space of the first electronic device 10 (e.g., step 1130-N), the first electronic device 10 may provide, to the user, information about the electronic device of the type corresponding to the utterance, which is present in a space different from the space of the first electronic device 10, at step 1140. In FIG. 6, the command utterance of the user may read "play music". In this case, the electronic device corresponding to the command utterance may not be present in the living room. The electronic device corresponding to the command utterance may include the first AI speaker 601 of the room 1 and the second AI speaker 602 of the room 2. The first electronic device 10 may search for the electronic device corresponding to the command utterance from electronic devices associated with a user account (e.g., an account associated with the first electronic device 10), and may provide found electronic device information to the user. The first electronic device 10 may provide, to the user, information about the first AI speaker 601 and the second AI speaker 602 of the room 2, which are found electronic devices, and may request the user to select an electronic device for executing the command utterance. In the present example, for convenience, the third electronic device 30 is described as an electronic device not corresponding to the command "play music", but embodiments of the present disclosure are not limited thereto. A person skilled in the art could understand that an electronic device corresponding to the command "play music" may encompass the third electronic device 30.

At step 1145, the first electronic device 10 may process the command utterance according to a user input. When the user selects the first AI speaker 601, the first electronic device 10 may play music using the first AI speaker 601.

Figure 12:
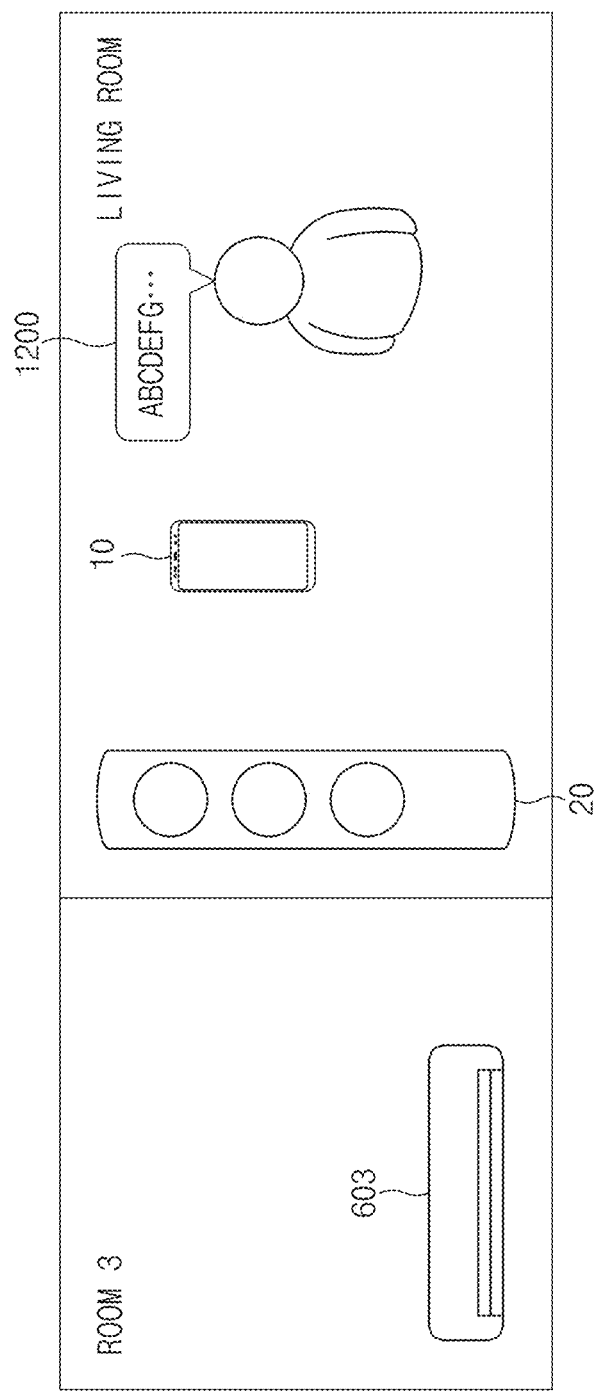
FIG. 12 illustrates a voice command processing environment, according to an embodiment.

FIG. 12 illustrates a voice command processing environment, according to an embodiment.

In FIG. 12, the user may execute a command utterance 1200. The first electronic device 10 may receive (e.g., step 1110 of FIG. 11) the command utterance.

The command utterance 1200 may read "turn off the air conditioner". In this case, since the command utterance 1200 does not include location information, the first electronic device 10 may turn off the power of the second electronic device 20 step in a living room that is the location of the first electronic device 10 (e.g., step 1135 of FIG. 11). In this case, when the user gives the command utterance 1200 in the room 3 unlike the example of FIG. 12, the first electronic device 10 may turn off the power of the air conditioner 603 of the room 3.

The command utterance 1200 may read "turn off the air conditioner in the living room". In this case, since the command utterance 1200 includes location information (e.g., living room) (e.g., step 1120-Y of FIG. 11), the first electronic device 10 may turn off the power of the second electronic device 20 located in the living room (e.g., step 1125 of FIG. 11). The command utterance 1200 may read "turn off the air conditioner in the room 3". In this case, since the command utterance 1200 includes location information (e.g., room 3) (e.g., step 1120-Y of FIG. 11), the first electronic device 10 may turn off the power of the air conditioner 603 located in the room 3 (e.g., step 1125 of FIG. 11).

Figure 13:
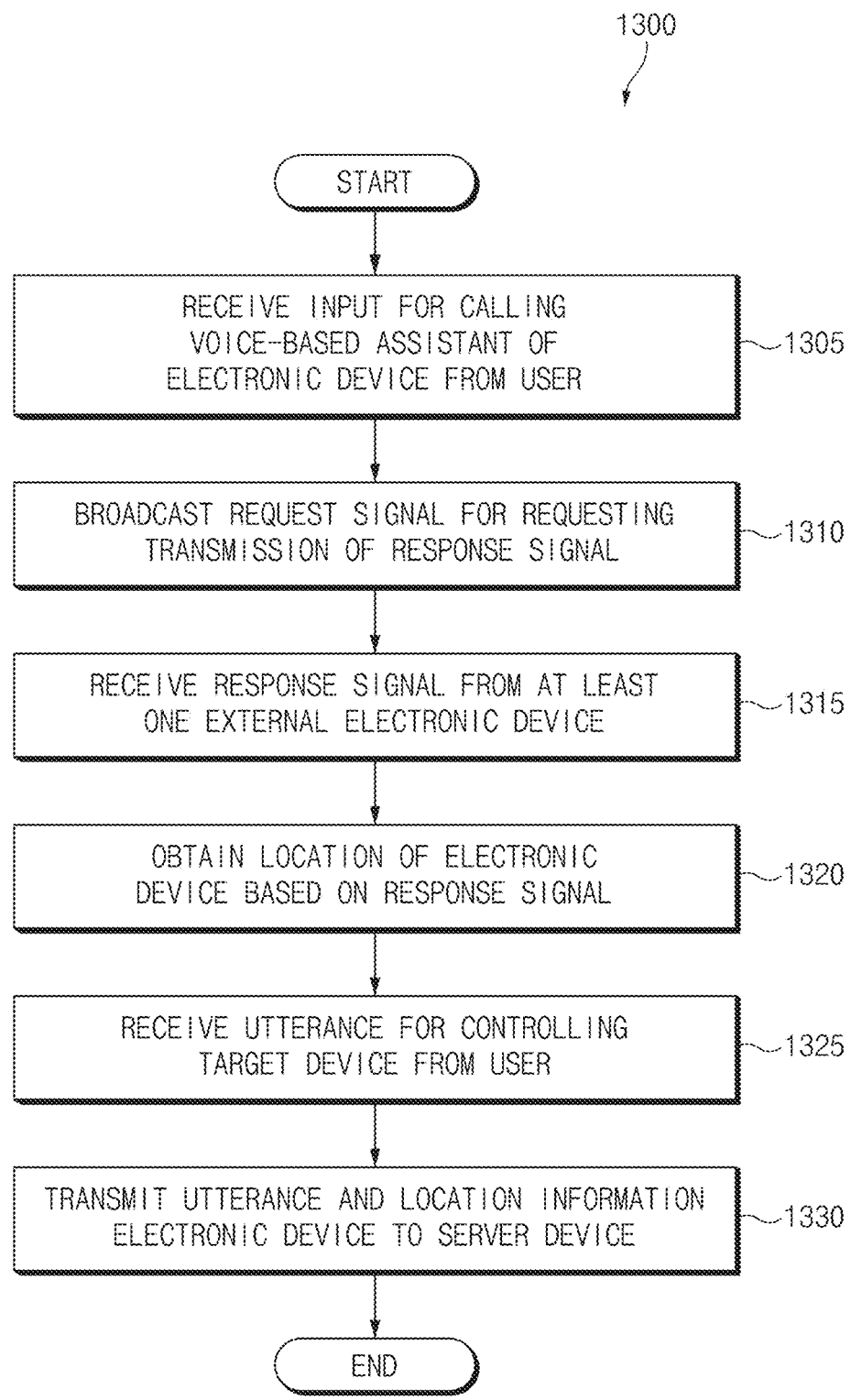
FIG. 13 is a flowchart illustrating a method for an electronic device to control another electronic device, according to an embodiment.

FIG. 13 is a flowchart 1300 illustrating a method for an electronic device to control another electronic device, according to an embodiment.

An electronic device may include an audio reception circuit, a communication circuit, a processor operatively connected to the audio reception circuit and the communication circuit, and a memory operatively connected to the processor. The memory may store one or more instructions that, when executed, cause the processor to perform the operations of electronic devices described below.

At step 1305, the electronic device may receive, from the user, an input for calling a voice-based assistant of an electronic device. The input for calling the voice-based assistant may be a wake-up utterance. The input for calling the voice-based assistant may include an input for a physical button or a touch input for executing a voice-based assistant application.

At step 1310, the electronic device may broadcast a request signal for requesting transmission of a response signal. The electronic device may broadcast the request signal including information (e.g., identification information about an electronic device, type information about an electronic device, and/or location information about an electronic device) about the electronic device. The electronic device may broadcast the request signal including information about the electronic device and audio information (e.g., reception strength, SNR, and/or reliability of a wake-up utterance (e.g., utterance of a wake-up word)).

At step 1315, the first electronic device may receive a response signal from at least one external electronic device. The response signal may include information (e.g., identification information, type information, and/or location information about an external electronic device) about at least one external electronic device. The response signal may include information about at least one external electronic device and audio information (e.g., reception strength, SNR, and/or reliability of a wake-up utterance). The at least one external electronic device may be electronic devices associated with the same user account as the electronic device.

At step 1320, the electronic device may obtain the location of the electronic device based on the response signal. The electronic device may determine the location of the electronic device according to step 725 of FIG. 7 or step 815 of FIG. 8. The electronic device may determine a device for transmitting a control utterance by comparing audio information obtained by the electronic device with audio information of the response signal.

At step 1325, the electronic device may receive a control utterance for controlling a target device. The control utterance for controlling the target device may correspond to a command utterance. The electronic device may be an electronic device determined as a device for transmitting the control utterance based on audio information. In the case where the control utterance is not an utterance for controlling another electronic device, the electronic device may be configured to process the control utterance.

In the case where the control utterance is an utterance for controlling another electronic device, the electronic device may determine a target device corresponding to the control utterance based on location information included in the control utterance and the location of the electronic device. The electronic device may determine, as the target device, an external electronic device corresponding to the location of the electronic device among external electronic devices of a type corresponding to the control utterance.

At step 1330, the electronic device may transmit the utterance and the location information about the electronic device to a server device. The electronic device may control the target device by transmitting the utterance and the location information about the electronic device to the server.

Figure 14:
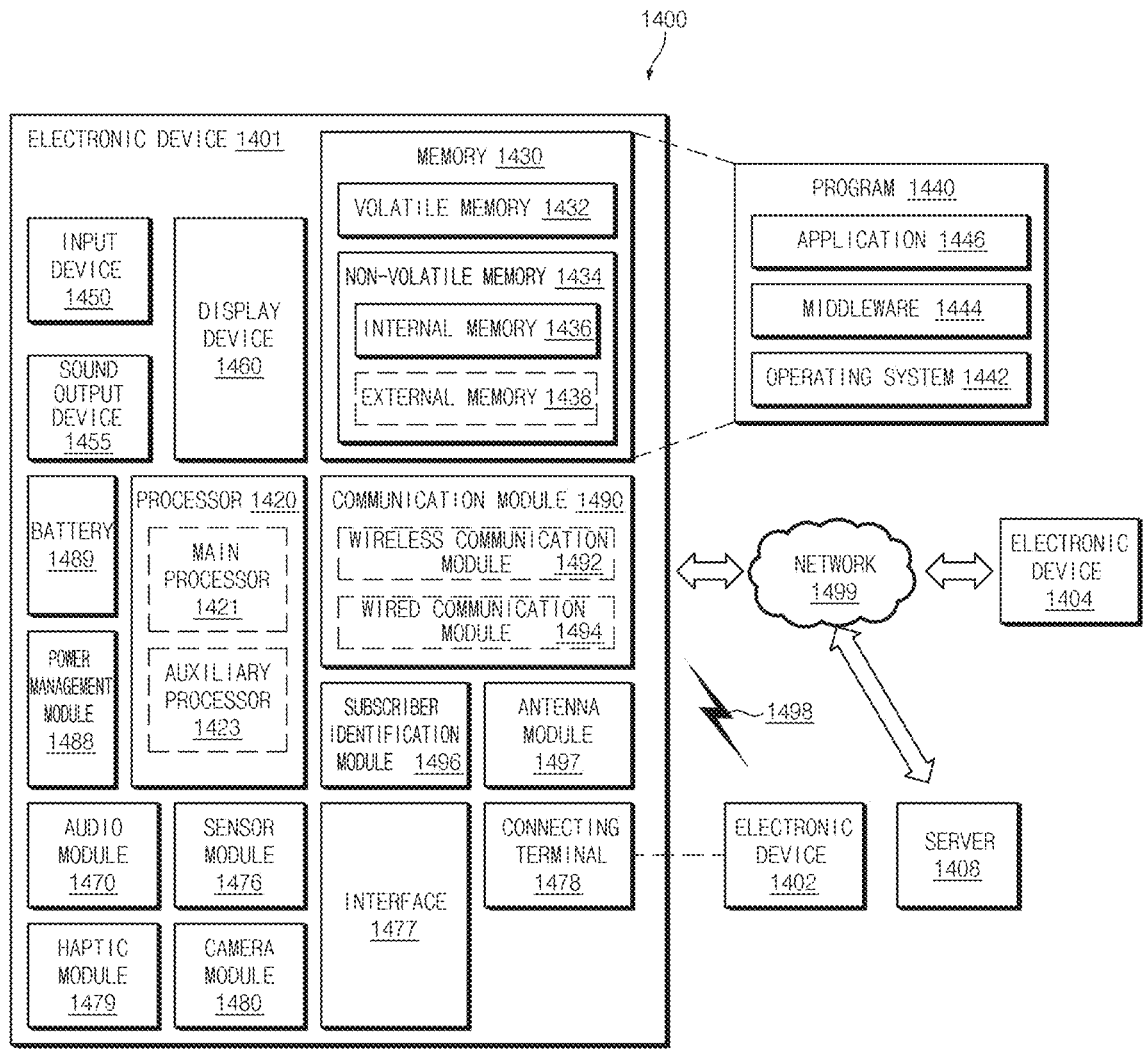
FIG. 14 is a block diagram illustrating an electronic device in a network environment according to various embodiments.

FIG. 14 is a block diagram illustrating an electronic device 1401 in a network environment 1400 according to various embodiments. Referring to FIG. 14, the electronic device 1401 in the network environment 1400 may communicate with an electronic device 1402 via a first network 1498 (e.g., a short-range wireless communication network), or an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420, memory 1430, an input device 1450, a sound output device 1455, a display device 1460, an audio module 1470, a sensor module 1476, an interface 1477, a haptic module 1479, a camera module 1480, a power management module 1488, a battery 1489, a communication module 1490, a subscriber identification module (SIM) 1496, or an antenna module 1497. In some embodiments, at least one (e.g., the display device 1460 or the camera module 1480) of the components may be omitted from the electronic device 1401, or one or more other components may be added in the electronic device 1401. In some embodiments, some of the components may be implemented as single integrated circuitry. For example, the sensor module 1476 (e.g., a fingerprint sensor, an iris sensor, or an illuminance sensor) may be implemented as embedded in the display device 1460 (e.g., a display).

The processor 1420 may execute, for example, software (e.g., a program 1440) to control at least one other component (e.g., a hardware or software component) of the electronic device 1401 coupled with the processor 1420, and may perform various data processing or computation. According to one embodiment, as at least part of the data processing or computation, the processor 1420 may load a command or data received from another component (e.g., the sensor module 1476 or the communication module 1490) in volatile memory 1432, process the command or the data stored in the volatile memory 1432, and store resulting data in non-volatile memory 1434. According to an embodiment, the processor 1420 may include a main processor 1421 (e.g., a central processing unit (CPU) or an application processor (AP)), and an auxiliary processor 1423 (e.g., a graphics processing unit (GPU), an image signal processor (ISP), a sensor hub processor, or a communication processor (CP)) that is operable independently from, or in conjunction with, the main processor 1421. Additionally or alternatively, the auxiliary processor 1423 may be adapted to consume less power than the main processor 1421, or to be specific to a specified function. The auxiliary processor 1423 may be implemented as separate from, or as part of the main processor 1421.

The auxiliary processor 1423 may control at least some of functions or states related to at least one component (e.g., the display device 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an image signal processor or a communication processor) may be implemented as part of another component (e.g., the camera module 1480 or the communication module 1490) functionally related to the auxiliary processor 1423.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input device 1450 may receive a command or data to be used by other component (e.g., the processor 1420) of the electronic device 1401, from the outside (e.g., a user) of the electronic device 1401. The input device 1450 may include, for example, a microphone, a mouse, or a keyboard.

The sound output device 1455 may output sound signals to the outside of the electronic device 1401. The sound output device 1455 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1460 may visually provide information to the outside (e.g., a user) of the electronic device 1401. The display device 1460 may include, for example, a display, a hologram device, or a projector and control circuitry to control a corresponding one of the display, hologram device, and projector. According to an embodiment, the display device 1460 may include touch circuitry adapted to detect a touch, or sensor circuitry (e.g., a pressure sensor) adapted to measure the intensity of force incurred by the touch.

The audio module 1470 may convert a sound into an electrical signal and vice versa. According to an embodiment, the audio module 1470 may obtain the sound via the input device 1450, or output the sound via the sound output device 1455 or a headphone of an external electronic device (e.g., an electronic device 1402) directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. According to an embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly (e.g., wiredly) or wirelessly. According to an embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device (e.g., the electronic device 1402). According to an embodiment, the connecting terminal 1478 may include, for example, a HDMI connector, a USB connector, a SD card connector, or an audio connector (e.g., a headphone connector), The haptic module 1479 may convert an electrical signal into a mechanical stimulus (e.g., a vibration or a movement) or electrical stimulus which may be recognized by a user via his tactile sensation or kinesthetic sensation. According to an embodiment, the haptic module 1479 may include, for example, a motor, a piezoelectric element, or an electric stimulator.

The camera module 1480 may capture a still image or moving images. According to an embodiment, the camera module 1480 may include one or more lenses, image sensors, image signal processors, or flashes.

The power management module 1488 may manage power supplied to the electronic device 1401. According to one embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the AP) and supports a direct (e.g., wired) communication or a wireless communication. According to an embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or infrared data association (IrDA)) or the second network 1499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The antenna module 1497 may transmit or receive a signal or power to or from the outside (e.g., the external electronic device) of the electronic device 1401. According to an embodiment, the antenna module 1497 may include one or more antennas, and, therefrom, at least one antenna appropriate for a communication scheme used in the communication network, such as the first network 1498 or the second network 1499, may be selected, for example, by the communication module 1490 (e.g., the wireless communication module 1492). The signal or the power may then be transmitted or received between the communication module 1490 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1401 and the external electronic device 1404 via the server 1408 coupled with the second network 1499. Each of the electronic devices 1402 and 1404 may be a device of a same type as, or a different type, from the electronic device 1401. According to an embodiment, all or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the present disclosure, an improved method for controlling an electronic device based on a voice in a multi-device environment may be provided.

According to various embodiments of the present disclosure, user convenience may be improved by updating the locations of various electronic devices.

According to various embodiments of the present disclosure, a method for controlling an electronic device according to the intention of a user by selecting an electronic device based on the location of the user may be provided.

Various effects may be provided that are directly or indirectly identified through the present disclosure.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
an audio reception circuit;
a communication circuit;
a processor operatively connected to the audio reception circuit and the communication circuit; and
a memory operatively connected to the processor,
wherein the memory stores one or more instructions that, when executed, cause the processor to:
broadcast, when a wake-up utterance is received from a user, a broadcasting signal comprising identification information and location information of the electronic device,
receive, from a plurality of external electronic devices, response signals including location information of the plurality of external electronic devices using the communication circuit, the location information is pre-designated for each of the plurality of external electronic devices,
determine, among the electronic device and the plurality of external electronic devices, a control device to process utterances based on the location information of the electronic device and the location information of the plurality of external electronic devices,
when the electronic device is determined as the control device, receive a control utterance from the user using the audio reception circuit, and transmit the control utterance and location information about the electronic device to a server device using the communication circuit, and
when one of the plurality of external electronic devices is determined as the control device, refrain from responding to the control utterance.

2. The electronic device of claim 1, wherein the response signals further include audio information about the wake-up utterance received by the plurality of external electronic devices.

3. The electronic device of claim 2, wherein the one or more instructions, when executed, further cause the processor to:
determine the control device by comparing audio information about the wake-up utterance received by the electronic device with the audio information of the response signals.

4. The electronic device of claim 1, wherein the electronic device and the plurality of external electronic devices are associated with the same user account.

5. The electronic device of claim 1, wherein the one or more instructions, when executed, further cause the processor to process the control utterance by the electronic device when the control utterance is not for controlling another electronic device.

6. The electronic device of claim 1, wherein, when the control utterance is for controlling another electronic device, the one or more instructions, when executed, further cause the processor to:
when the electronic device is determined as the control device, determine a target device corresponding to the control utterance based on location information included in the control utterance and the location information of the electronic device, and
transmit the control utterance and the location information about the electronic device to the server device to process the control utterance using the target device.

7. A method for an electronic device, the method comprising:
broadcasting, when a wake-up utterance is received from a user, a broadcasting signal comprising identification information and location information of the electronic device;
receiving, from a plurality of external electronic devices, response signals including location information of the plurality of external electronic devices, the location information is pre-designated for each of the plurality of external electronic devices;
determining, among the electronic device and the plurality of external electronic devices, a control device to process utterances based on the location of the electronic device and the location information of the plurality of external electronic devices;
when the electronic device is determined as the control device, receiving a control utterance from the user, and transmitting the control utterance and the location information about the electronic device to a server device; and
when one of the plurality of external electronic devices is determined as the control device, refraining from responding to the control utterance.

8. The method of claim 7, wherein the response signals further include audio information about the wake-up utterance received by the plurality of external electronic devices.

9. The method of claim 8, wherein determining the control device comprises:
determining the control device by comparing audio information about the wake-up utterance received by the electronic device with the audio information of the response signals.

10. The method of claim 7, wherein the electronic device and the plurality of external electronic devices are associated with the same user account.

11. The method of claim 7, further comprising processing the control utterance by the electronic device when the control utterance is not for controlling another electronic device.

12. The method of claim 7, further comprising:
when the electronic device is determined as the control device, determining a target device corresponding to the control utterance based on location information included in the control utterance and the location information of the electronic device, when the control utterance is for controlling another electronic device.

\* \* \* \* \*